US012192821B2

United States Patent
Zhao et al.

(10) Patent No.: US 12,192,821 B2
(45) Date of Patent: Jan. 7, 2025

(54) DATA TRANSMISSION METHOD AND APPARATUS, SYSTEM, AND STORAGE MEDIUM

(71) Applicant: HUAWEI TECHNOLOGIES CO., LTD., Guangdong (CN)

(72) Inventors: Fengyu Zhao, Shenzhen (CN); Cuili Ge, Beijing (CN); Yanmei Yang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 356 days.

(21) Appl. No.: 17/697,020

(22) Filed: Mar. 17, 2022

(65) Prior Publication Data
US 2022/0210690 A1    Jun. 30, 2022

Related U.S. Application Data
(63) Continuation of application No. PCT/CN2019/109754, filed on Sep. 30, 2019.

(51) Int. Cl.
*H04W 28/02* (2009.01)
*H04W 4/06* (2009.01)
(Continued)

(52) U.S. Cl.
CPC ......... *H04W 28/0268* (2013.01); *H04W 4/06* (2013.01); *H04W 40/24* (2013.01); *H04W 72/30* (2023.01); *H04W 72/54* (2023.01)

(58) Field of Classification Search
CPC ... H04W 28/0268; H04W 4/06; H04W 40/24; H04W 72/30; H04W 72/54; H04W 40/02;
(Continued)

(56) References Cited

U.S. PATENT DOCUMENTS
2016/0338011 A1* 11/2016 Mizusawa ............. H04W 72/23
2018/0338265 A1   11/2018 Goel et al.
(Continued)

FOREIGN PATENT DOCUMENTS
CN  109699013 A  4/2019
CN  109769150 A  5/2019
(Continued)

OTHER PUBLICATIONS
Huawei, HiSilicon, Support of forwarding of broadcast and multicast packets. 3GPP TSG-SA2 Meeting #134, Sapporo, Japan, Jun. 24, 2019-Jun. 28, 2019, S2-1907700, 10 pages.
(Continued)

*Primary Examiner* — Mohamed A Kamara

(57) ABSTRACT

A data transmission method and apparatus, a system, and a storage medium are provided. In the method, a user plane function network element performs transmission through an established unicast user plane connection, and when sending data of a first service to an access network device, the user plane function network element can be configured to send only the data that is of the first service and that is carried in one data flow to improve use efficiency of resources on a core network side. Then, the access network device can send, in a multicast manner through an established unicast channel, the received data of the first service to a group of terminals corresponding to the data of the first service, and does not need to additionally establish a multicast channel and switch to the multicast channel, thereby further reducing data transmission delay.

20 Claims, 15 Drawing Sheets

(51) Int. Cl.
*H04W 40/24* (2009.01)
*H04W 72/30* (2023.01)
*H04W 72/54* (2023.01)

(58) Field of Classification Search
CPC ....... H04L 45/16; H04L 45/38; H04L 12/189; H04L 12/1881; H04L 47/24; H04L 47/2441
See application file for complete search history.

(56) References Cited

U.S. PATENT DOCUMENTS

| | | | | |
|---|---|---|---|---|
| 2019/0238352 | A1* | 8/2019 | Ge | H04L 67/55 |
| 2021/0068003 | A1* | 3/2021 | Kadiri | H04L 1/1812 |
| 2022/0182871 | A1* | 6/2022 | Na | H04W 28/0268 |

FOREIGN PATENT DOCUMENTS

| | | |
|---|---|---|
| CN | 110167068 A | 8/2019 |
| CN | 110267312 A | 9/2019 |
| EP | 3700223 A1 | 8/2020 |
| WO | 2018131902 A1 | 7/2018 |
| WO | 2019091456 A1 | 5/2019 |
| WO | 2019114939 A1 | 6/2019 |
| WO | 2019136128 A1 | 7/2019 |

OTHER PUBLICATIONS

3GPP TS 22.146 V15.0.0 : "3rd Generation Partnership Project; Technical Specification Group Services and System Aspects;Multimedia Broadcast/Multicast Service (MBMS); Stage 1(Release 15)",Jul. 2019,total 18 pages.

3GPP TS 29.281 V15.6.0 (Sep. 2019)3rd Generation Partnership Project; Technical Specification Group Core Network and Terminals;General Packet Radio System (GPRS) Tunnelling Protocol User Plane (GTPv1-U)(Release 15), total 32 pages.

3GPP TS 38.300 V15.7.0 (Sep. 2019), 3rd Generation Partnership Project; Technical Specification Group Radio Access Network; NR; NR and NG-RAN Overall Description; Stage 2(Release 15), 99 pages.

3GPP TS 38.413 V15.4.0 (Jul. 2019), 3rd Generation Partnership Project; Technical Specification Group Radio Access Network; NG-RAN; NG Application Protocol (NGAP)(Release 15), 328 pages.

5G-Xcast_D4.3_v1.0, Broadcast and Multicast Communication Enablers for the Fifth-Generation of Wireless Systems. Deliverable D4.3, Session Control and Management. Version v1.0, Nov. 14, 2018, 48 pages.

3GPP TS 24.501 V16.2.0 (Sep. 2019), 3rd Generation Partnership Project; Technical Specification Group Core Network and Terminals; Non-Access-Stratum (NAS) protocol for 5G System (5GS); Stage 3(Release 15), 610 pages.

3GPP TS 23.501 V16.2.0 (Sep. 2019), 3rd Generation Partnership Project; Technical Specification Group Services and System Aspects; System Architecture for the 5G System (5GS); Stage 2(Release 16), 389 pages.

3GPP TS 23.502 V16.2.0 (Sep. 2019), 3rd Generation Partnership Project; Technical Specification Group Services and System Aspects; Procedures for the 5G System (5GS); Stage 2(Release 16), 524 pages.

* cited by examiner

DATA TRANSMISSION METHOD AND APPARATUS, SYSTEM, AND STORAGE MEDIUM

CROSS-REFERENCE TO RELATED APPLICATIONS

This application is a continuation of International Application No. PCT/CN2019/109754, filed on Sep. 30, 2019, the disclosure of which is hereby incorporated by reference in its entirety.

TECHNICAL FIELD

Embodiments of this disclosure relate to communications technologies, and in particular, to a data transmission method and apparatus, a system, and a storage medium.

BACKGROUND

A data network (DN), for example, an IP multimedia service (IMS) network or the internet, may provide a data service for a user. The data service may be a service such as a video, audio, or a picture.

Currently, in a 5th generation (5G) mobile communications network system, a data network may send data to a terminal through a unicast user plane connection established between the data network and the terminal. An existing 5G network system currently does not support a broadcast transmission mechanism. If the data network needs to send same data to a plurality of terminals, the data network needs to send the same data to a group of terminals through a unicast user plane connection, causing a waste of network resources. In addition, if a 4th generation (4G) mobile communications broadcast transmission mechanism is considered to be integrated into the 5G network system, a specific broadcast channel further needs to be used between an access network device and a terminal of a user. In this way, a switching procedure needs to be introduced when a unicast transmission mechanism and a broadcast transmission mechanism are switched, resulting in an increase in a delay.

SUMMARY

Embodiments of this disclosure provide a data transmission method and apparatus, a system, and a storage medium, to reduce a data transmission delay, and improve use efficiency of resources on an air interface side and a core network side.

According to a first aspect, an embodiment provides a data transmission method in which an access network device receives data that is of a first service and that is carried in a first QoS flow. The first QoS flow includes a common QoS flow between the access network device and a first user plane function network element or a QoS flow of a first terminal. Both the access network device and the first user plane function network element are nodes in the QoS flow of the first terminal. The access network device sends, in a multicast manner, the data of the first service to a group of terminals corresponding to the data of the first service, where the group of terminals includes the first terminal.

In this embodiment, the user plane function network element may perform transmission through an established unicast user plane connection, and does not need to additionally establish a multicast user plane connection, thereby reducing data transmission delay. When sending the data of the first service to the access network device, the user plane function network element can be configured to send only the data that is of the first service and that is carried in one data flow so as to improve use efficiency of resources on the core network side. In addition, after receiving the data that is of the first service and that is in the first QoS flow, the access network device can send, in a multicast manner through an established unicast channel, the data of the first service to the group of terminals corresponding to the data of the first service, and does not need to additionally establish a multicast channel and switch to the multicast channel, to further reduce a data transmission delay.

In a possible design, the method further includes: The access network device receives the data that is of the first service and that is carried in a second QoS flow, where the second QoS flow includes a common QoS flow between the access network device and a second user plane function network element or a QoS flow of a second terminal, and both the access network device and the second user plane function network element are nodes in the QoS flow of the second terminal.

The group of terminals corresponding to the data of the first service includes one of the following: a first group of terminals corresponding to the first QoS flow, a second group of terminals corresponding to the second QoS flow, or a set of the first group of terminals and the second group of terminals.

In a possible design, that the access network device sends, in a multicast manner, the data of the first service to a group of terminals corresponding to the data of the first service includes: The access network device sends, to the group of terminals in a multicast manner, the data that is of the first service and that is carried in the first QoS flow or the second QoS flow.

In this design, when receiving the data that is of the first service and that is carried in the first QoS flow from the first user plane function network element and the data that is of the first service and that is carried in the second QoS flow from the second user plane function network element, the access network device may send the data of the first service to the group of terminals corresponding to the data of the first service, where the group of terminals may be the first group of terminals corresponding to the first QoS flow, the second group of terminals corresponding to the second QoS flow, or the set of the first group of terminals and the second group of terminals. Further, in this embodiment of this application, the access network device may send, to the group of terminals, the data that is of the first service and that is carried in the first QoS flow or the second QoS flow, and perform optimized transmission on the data, to improve use efficiency of resources on an air interface side.

In a possible design, the method further includes: The access network device receives a first correspondence.

The first correspondence includes: a correspondence between the first QoS flow and the group of terminals; or a correspondence between the first QoS flow and any terminal in the group of terminals; or a correspondence between the first QoS flow and any terminal other than the first terminal in the group of terminals; or a correspondence between the data of the first service and any terminal in the group of terminals.

In a possible design, the first correspondence further includes a correspondence between the first QoS flow and content of the data carried in the first QoS flow.

In this design, the access network device may determine, based on the first correspondence, that data of a multicast service (the first service) corresponds to a group of terminals, so that the access network device can send the data of the first service to the group of terminals in a multicast manner through an established unicast channel, to reduce a data transmission delay.

In a possible design, that the access network device receives a first correspondence includes: The access network device receives the first correspondence from a session management function network element.

In a possible design, the correspondence between the first QoS flow and the group of terminals includes a correspondence between identification information of the first QoS flow and identification information and/or tunnel information of a QoS flow of each terminal in the group of terminals; the correspondence between the first QoS flow and any terminal in the group of terminals includes a correspondence between the identification information of the first QoS flow and identification information and/or tunnel information of a QoS flow of the any terminal in the group of terminals; the correspondence between the first QoS flow and the any terminal other than the first terminal in the group of terminals includes a correspondence between the identification information of the first QoS flow and identification information and/or tunnel information of a QoS flow of the any terminal other than the first terminal in the group of terminals; and the correspondence between the data of the first service and the any terminal in the group of terminals includes a correspondence between index information of the data of the first service and identification information and/or tunnel information of a QoS flow of the any terminal in the group of terminals.

According to a second aspect, an embodiment of this application provides a data transmission method, including: A user plane function network element receives at least one data flow of a first service, where the first service is a multicast service. The user plane function network element sends, to an access network device by using a first QoS flow, data that is of the first service and that is carried in any one of the at least one data flow, where the first QoS flow includes a common QoS flow between the access network device and the user plane function network element or a QoS flow of a first terminal, and both the access network device and the user plane function network element are nodes in the QoS flow of the first terminal.

In a possible design, the method further includes: The user plane function network element receives first indication information from a session management function network element, where the first indication information indicates the first QoS flow used to carry the data of the first service.

In a possible design, the first indication information includes a filtering rule of a group of terminals or a first correspondence, where the group of terminals includes the first terminal.

The first correspondence includes: a correspondence between the first QoS flow and the group of terminals; or a correspondence between the first QoS flow and any terminal in the group of terminals; or a correspondence between the first QoS flow and any terminal other than the first terminal in the group of terminals; or a correspondence between the data of the first service and any terminal in the group of terminals.

In a possible design, the first correspondence further includes a correspondence between the first QoS flow and content of the data carried in the first QoS flow.

In a possible design, the correspondence between the first QoS flow and the group of terminals includes a correspondence between identification information of the first QoS flow and identification information and/or tunnel information of a QoS flow of each terminal in the group of terminals; the correspondence between the first QoS flow and the any terminal in the group of terminals includes a correspondence between the identification information of the first QoS flow and identification information and/or tunnel information of a QoS flow of the any terminal in the group of terminals; the correspondence between the first QoS flow and the any terminal other than the first terminal in the group of terminals includes a correspondence between the identification information of the first QoS flow and identification information and/or tunnel information of a QoS flow of the any terminal other than the first terminal in the group of terminals; and the correspondence between the data of the first service and the any terminal in the group of terminals includes a correspondence between index information of the data of the first service and identification information and/or tunnel information of a QoS flow of the any terminal in the group of terminals.

In a possible design, before the user plane function network element receives the at least one data flow of the first service, the method further includes: The user plane function network element receives a QoS flow establishment request from the session management function network element, and establishes the first QoS flow, where the QoS flow establishment request indicates to establish the first QoS flow.

For beneficial effects of the data transmission method provided in the second aspect and the possible designs, refer to the beneficial effects brought by the first aspect and the possible designs. Details are not described herein.

According to a third aspect, an embodiment of this application provides a data transmission method, including: A session management function network element sends first indication information to a first user plane function network element, where the first indication information indicates a first QoS flow used to carry data of a first service; and the first QoS flow includes a common QoS flow between an access network device and the first user plane function network element or a QoS flow of a first terminal, both the access network device and the first user plane function network element are nodes in the QoS flow of the first terminal, and the first service is a multicast service.

In a possible design, the method further includes: The session management function network element sends second indication information to a second user plane function network element, where the second indication information indicates a second QoS flow used to carry the data of the first service, the second QoS flow includes a common QoS flow between the access network device and the second user plane function network element or a QoS flow of a second terminal, and both the access network device and the second user plane function network element are nodes in the QoS flow of the second terminal.

In a possible design, the first indication information includes a filtering rule of a group of terminals or a first correspondence, where the group of terminals includes the first terminal.

The first correspondence includes: a correspondence between the first QoS flow and the group of terminals; or a correspondence between the first QoS flow and any terminal in the group of terminals; or a correspondence between the first QoS flow and any terminal other than the first terminal in the group of terminals; or a correspondence between the data of the first service and any terminal in the group of terminals.

In a possible design, the first correspondence further includes a correspondence between the first QoS flow and content of the data carried in the first QoS flow.

In a possible design, the method further includes: The session management function network element sends a session management message to the access network device, where the session management message includes the first correspondence.

In a possible design, the correspondence between the first QoS flow and the group of terminals includes a correspondence between identification information of the first QoS flow and identification information and/or tunnel information of a QoS flow of each terminal in the group of terminals; the correspondence between the first QoS flow and the any terminal in the group of terminals includes a correspondence between the identification information of the first QoS flow and identification information and/or tunnel information of a QoS flow of the any terminal in the group of terminals; the correspondence between the first QoS flow and the any terminal other than the first terminal in the group of terminals includes a correspondence between the identification information of the first QoS flow and identification information and/or tunnel information of a QoS flow of the any terminal other than the first terminal in the group of terminals; and the correspondence between the data of the first service and the any terminal in the group of terminals includes a correspondence between index information of the data of the first service and identification information and/or tunnel information of a QoS flow of the any terminal in the group of terminals.

In a possible design, when the correspondence between the data of the first service and the any terminal in the group of terminals includes the correspondence between the index information of the data of the first service and the identification information and/or tunnel information of the QoS flow of the any terminal in the group of terminals, the method further includes: The session management function network element obtains the index information from a server of the first service. Alternatively, the session management function network element obtains the index information from the group of terminals. Alternatively, the session management function network element generates the index information.

In a possible design, the method further includes: The session management function network element receives a QoS flow establishment request from the first terminal or the server of the first service, and generates the first correspondence, where the QoS flow establishment request indicates to establish the first QoS flow.

For beneficial effects of the data transmission method provided in the third aspect and the possible designs, refer to the beneficial effects brought by the first aspect and the possible designs. Details are not described herein.

According to a fourth aspect, an embodiment of this application provides a data transmission apparatus. The data transmission apparatus is an access network device, and the data transmission apparatus includes a sending module and a receiving module. The sending module is configured to perform the sending action of the access network device in the first aspect and the possible designs, and the receiving module is configured to perform the receiving action of the access network device in the first aspect and the possible designs.

According to a fifth aspect, an embodiment of this application provides a data transmission apparatus. The data transmission apparatus is a user plane function network element. The data transmission apparatus includes a sending module and a receiving module. The sending module is configured to perform the sending action of the user plane function network element in the second aspect and the possible designs, and the receiving module is configured to perform the receiving action of the user plane function network element in the second aspect and the possible designs.

According to a sixth aspect, an embodiment of this application provides a data transmission apparatus. The apparatus is a session management function network element. The data transmission apparatus includes a sending module and a receiving module. The sending module is configured to perform the sending action of the session management function network element in the third aspect and the possible designs, and the receiving module is configured to perform the receiving action of the session management function network element in the third aspect and the possible designs.

For beneficial effects of the data transmission apparatus provided in the fourth aspect, the fifth aspect, the sixth aspect, and the possible designs, refer to the beneficial effects brought by the first aspect, the second aspect, the third aspect, and the possible designs. Details are not described herein.

According to a seventh aspect, an embodiment of this application provides a data transmission apparatus. The apparatus may be the access network device in the fourth aspect, the user plane function network element in the fifth aspect, or the session management function network element in the sixth aspect. The data transmission apparatus includes a processor, a memory, a receiver, and a transmitter. Both the receiver and the transmitter are coupled to the processor, the processor controls the receiver to perform the receiving actions in the first aspect, the second aspect, and the third aspect, and the processor controls the transmitter to perform the sending actions in the first aspect, the second aspect, and the third aspect. The memory is configured to store computer executable program code, where the program code includes instructions. When the processor executes the instructions, the instructions enable the data transmission apparatus to perform the data transmission method provided in the first aspect or the possible designs of the first aspect.

According to an eighth aspect, an embodiment of this application provides a data transmission system, including, for example, an access network device, a user plane function network element, and a session management function network element. The access network device is configured to perform the method in the first aspect and the possible designs, the user plane function network element is configured to perform the method in the second aspect and the possible designs, and the session management function network element is configured to perform the method in the third aspect and the possible designs.

According to a ninth aspect, an embodiment of this application provides a computer-readable storage medium. The computer-readable storage medium stores instructions, and when the instructions are run on a computer, the computer is enabled to perform the methods in the possible designs of the first aspect, the second aspect, and the third aspect.

According to the data transmission method and apparatus, the system, and the storage medium provided in the embodiments of this application, the user plane function network element may perform transmission through an established unicast user plane connection, and does not need to additionally establish a multicast user plane connection, to reduce a data transmission delay, and when sending the data of the first service to the access network device, the user plane function network element sends only the data that is of the first service and that is carried in one data flow, to improve use efficiency of resources on a core network side. In addition, after receiving the data that is of the first service and that is in the first QoS flow, the access network device can send, in a multicast manner through an established unicast channel, the data of the first service to the group of terminals corresponding to the data of the first service, and does not need to additionally establish a multicast channel and switch to the multicast channel, to further reduce a data transmission delay.

DESCRIPTION OF EMBODIMENTS

Figure 1:
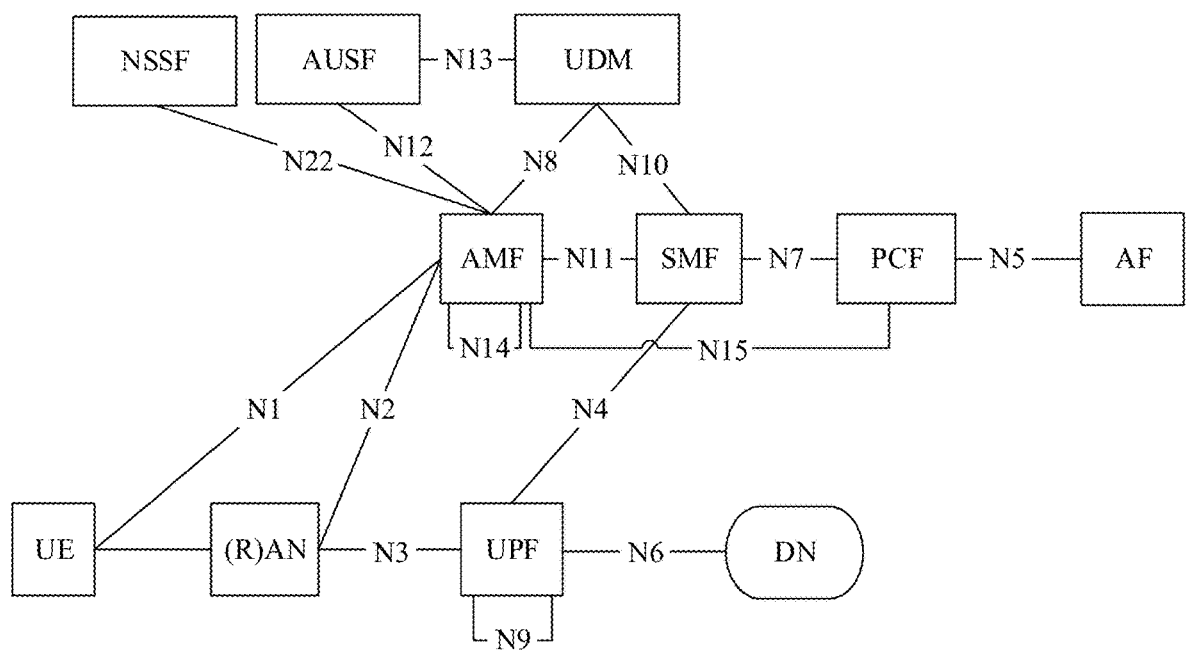
FIG. 1 is a schematic diagram of a network architecture according to an embodiment of this disclosure.

The following describes a network architecture to better understand a data transmission method provided in the embodiments of this disclosure. FIG. 1 is a schematic diagram of a network architecture according to an embodiment. As shown in FIG. 1, a 5G network architecture released by a 3GPP standard group includes a terminal or user equipment (UE), an access network (including a radio access network (RAN) or an access network (AN)) that supports a 3GPP technology, a user plane function (UPF) network element, an access and mobility management function (AMF) network element, a session management function (SMF) network element, a policy control function (PCF) network element, a unified data management (UDM) network element, an application function (AF) network element, and a data network (DN). A person skilled in the art will understand that the 5G network architecture shown in FIG. 1 is exemplary and constitutes no limitation on the 5G network architecture. In a specific implementation, the 5G network architecture may include more or fewer network elements than those shown in the figure, combine some network elements, or the like. It should be understood that the AN or the RAN is represented by a (R)AN in FIG. 1. An example in which an access network is the AN is used for description in the accompanying drawings in the embodiments of this application.

An access network device is a network element on an access network side. The AMF network element, the SMF network element, the UPF network element, the PCF network element, and the UDM network element are network elements in a 3GPP core network (core network elements for short). The UPF network element may be referred to as a user plane function network element, and is mainly responsible for transmitting user data. Another network element may be referred to as a control plane function network element, and is mainly responsible for authentication, authorization, registration management, session management, mobility management, policy control, and the like, to ensure reliable and stable transmission of the user data.

The terminal may be user equipment (UE), a handheld terminal, a notebook computer, a subscriber unit, a cellular phone, a smartphone, a wireless data card, a personal digital assistant (PDA) computer, a tablet computer, a wireless modem, a handheld device, a laptop computer, a cordless phone or a wireless local loop (WLL) station, a machine type communication (MTC) terminal, a handheld device having a wireless communication function, a computing device, a processing device connected to a wireless modem, an unmanned aerial vehicle, a vehicle-mounted device, a wearable device, a terminal in the internet of things, a virtual reality device, a terminal device in a future 5G network, a terminal in a future evolved public land mobile network (PLMN), or the like.

The foregoing access network device that supports the 3GPP technology is an access device that is in the network architecture and that is accessed by the terminal in a wireless manner, and is mainly responsible for radio resource management on an air interface side, quality of service (QoS) management, data compression and encryption, and the like. For example, the access network device is a base station NodeB, an evolved NodeB eNodeB, a base station in a 5G mobile communications system or a new radio (NR) communications system, or a base station in a future mobile communications system.

The AMF network element may be configured to manage access of the terminal to the core network, for example, location update of the terminal, network registration, access control, mobility management of the terminal, and attachment and detachment of the terminal. When providing a service for a session of the terminal, the AMF network element may further provide a control plane storage resource for the session, to store a session identifier, an SMF network element identifier associated with the session identifier, and the like.

The SMF network element may be configured to: select a user plane function network element for the terminal, redirect the user plane function network element for the terminal, allocate an internet protocol (IP) address to the terminal, establish a bearer (also referred to as a session) between the terminal and the UPF network element, and perform modification, release, and QoS control on a session. The bearer between the terminal and the UPF network element may include a user plane connection between the UPF network element and the access network device, and a channel established between the access network device and the terminal. The user plane connection is a quality of service (QoS) flow for transmitting data that may be established between the UPF network element and the access network device.

The UPF network element may be configured to: forward and receive data of the terminal. For example, the UPF network element may receive data of a service from a data network, and transmit the data of the service to the terminal by using the access network device. Alternatively, the UPF network element may receive user data from the terminal by using the access network device, and forward the user data to a data network. A transmission resource allocated and scheduled by the UPF network element to the terminal is managed and controlled by the SMF network element. It should be understood that the following UPF network element is briefly referred to as a UPF.

The PCF network element is configured to provide a policy, such as a QoS policy or a slice selection policy, for the AMF network element and the SMF network element.

The UDM network element is configured to store user data such as subscription information and authentication/authorization information.

The AF network element is configured to: interact with a 3GPP core network element to support routing of data transmission at an application layer, obtain a network exposure function, and interact with the PCF network element to perform policy control and the like.

The DN, for example, an IP multimedia service (IMS) network or the internet, may provide a data service for a user. The DN may include a plurality of application servers (ASs) to provide different application services, and the AS may implement a function of the AF. It should be understood that, for functions of a network slice selection function (NSSF) network element and an authentication server function (AUSF) network element that are shown in FIG. 1, refer to related descriptions in the conventional technology.

The QoS flow is a finest granularity of QoS differentiation in a protocol data unit (PDU) session. In a 5G network system, the QoS flow is controlled by the SMF. The QoS flow may be pre-configured, or may be established in a PDU session establishment procedure (refer to Section 4.3.2 in TS 23.502) or a PDU session modification procedure (refer to Section 4.3.3.1 in TS 23.502). Same forwarding processing (for example, a scheduling policy, a queue management policy, a rate shaping policy, or RLC configuration) is performed on data (including service data from the application server and/or user data from the terminal) mapped to a same QoS flow.

Identification information of the QoS flow may be a QoS flow identifier (quality of service flow identifier, QFI). The QFI uniquely identifies the QoS flow, and the QFI is unique in a PDU session of the terminal. For example, one PDU session may have a plurality of (a maximum of 64) QoS flows, but QFIs of all the QoS flows are different (a value range is 0 to 63). The QFI may be carried in an encapsulation header of a path N3 and/or a path N9.

The QoS flow has the following characteristics: The SMF network element sends a QoS profile to the access network device through a path N2 by using the AMF network element, or the QoS profile may be pre-configured in the access network device. The QoS flow has one or more QoS rules. The QoS rules or QoS parameters (refer to TS 24.501, the disclosure of which is incorporated herein by reference) associated with the QoS rules may be sent by the SMF network element to the terminal through a path N1 by using the AMF network element, or the QoS rules are derived by the terminal through application reflective QoS control. Further, the SMF network element may provide one or more uplink and downlink packet detection rules (PDRs) for the UPF network element.

Figure 2:
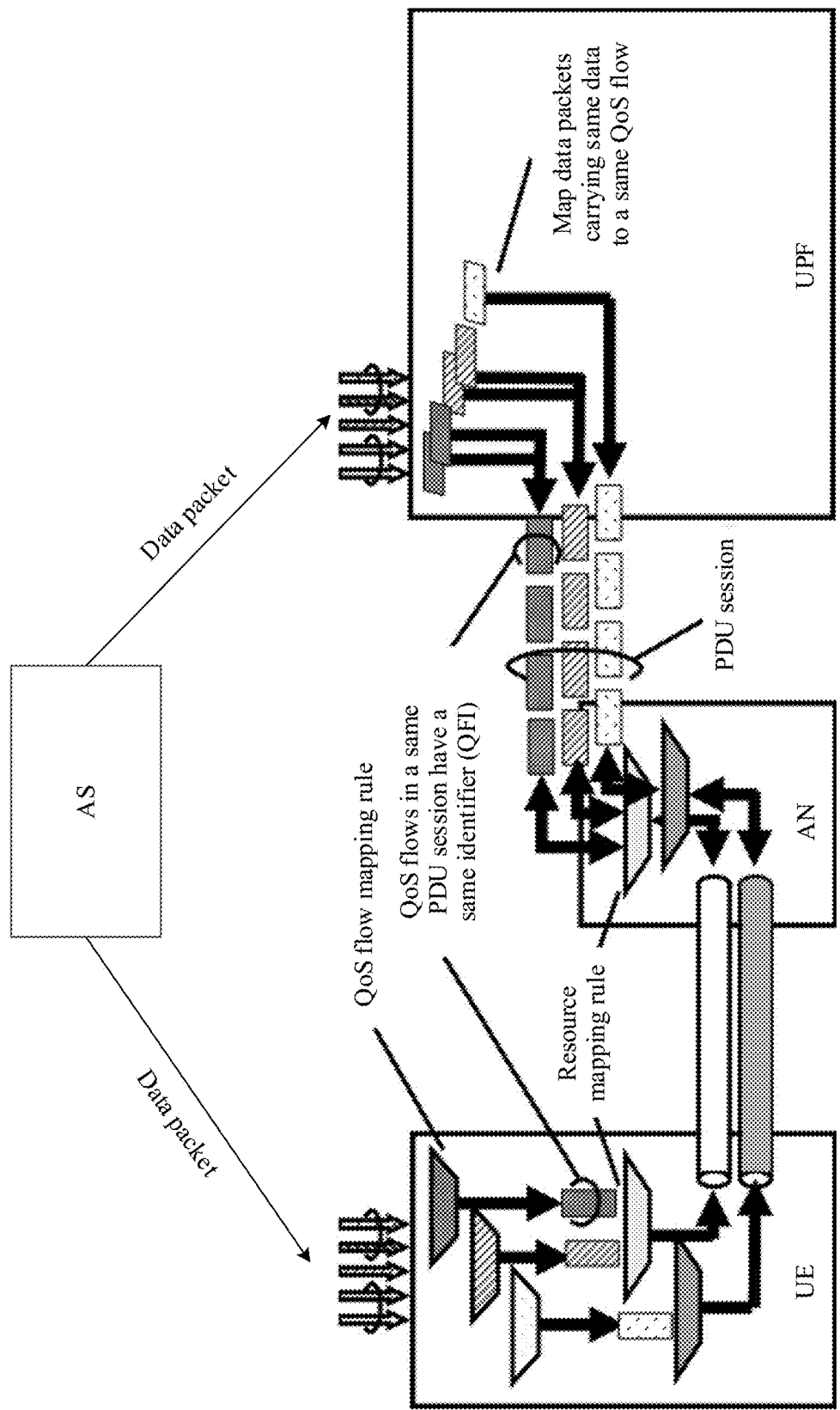
FIG. 2 is a diagram of a QoS flow mapping rule and a transmission procedure in a unicast transmission mechanism.

FIG. 2 is a diagram of a QoS flow mapping rule and a transmission procedure in a unicast transmission mechanism. As shown in FIG. 2, the following briefly describes the QoS flow mapping rule and the transmission procedure by using an example in which an application server transmits service data to a terminal. In a PDU session, a UPF network element receives service data (for example, the service data is encapsulated in a data packet) from the application server, and the UPF network element may map the data packet to a corresponding QoS flow according to the QoS flow mapping rule. The UPF network element maps, by using the QoS flow, data packets carrying same QoS data to a same QoS flow, and sends the data packets to an access network device. After receiving the data packet carried in the QoS flow, the access network device may map the received data packet to a corresponding AN resource (for example, a data radio bearer (DRB)) according to a preset resource mapping rule. The access network device sends the data packet to the terminal through the corresponding AN resource. Similarly, when sending user data to the application server, the terminal may also send the user data in a similar manner.

A type of a service of the data carried in the QoS flow may be a unicast service, a multicast service, a broadcast service, or the like. Correspondingly, the service data sent by the application server to the terminal is data of the unicast service, data of the multicast service, data of the broadcast service, or the like. The multicast service may be, for example, a service such as a live audio and video service (for example, a concert, a sports event, or a game), a group communication service, a vehicle-to-everything (V2X) service, or an internet of things (IOT) service. It should be understood that a broadcast service described below may be replaced with the multicast service.

Figure 3A:
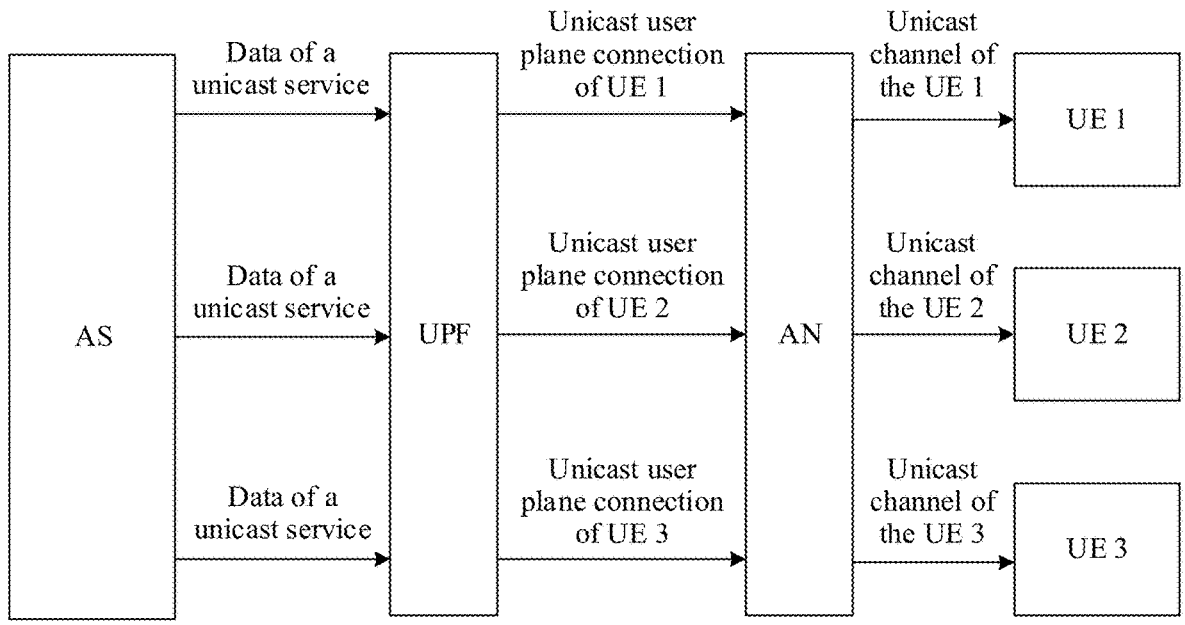
FIG. 3A is a schematic diagram of transmitting data by using a unicast transmission mechanism in the conventional technology.

FIG. 3A is a schematic diagram of transmitting data by using a unicast transmission mechanism in the conventional technology. As shown in FIG. 3A, a unicast QoS flow established between UE and a UPF includes a unicast user plane connection (or may be referred to as a unicast N3 user plane connection) established between the UPF and an AN, and a DRB (or a unicast channel) established between the AN and the UE that receives data of a unicast service. For example, FIG. 3A shows that the UPF receives data that is of each of UE 1, UE 2, and UE 3 and that is sent by an AS through a data flow (IP flow) corresponding to each of the UE 1, the UE 2, and the UE 3. The UPF sends data of a unicast service to the UE 1 through a unicast QoS corresponding to the UE 1. Similarly, the UPF sends data of a unicast service to the UE 2 through a unicast QoS flow corresponding to the UE 2, and the UPF sends data of a unicast service to the UE 3 through a unicast QoS flow corresponding to the UE 3.

Figure 3B:
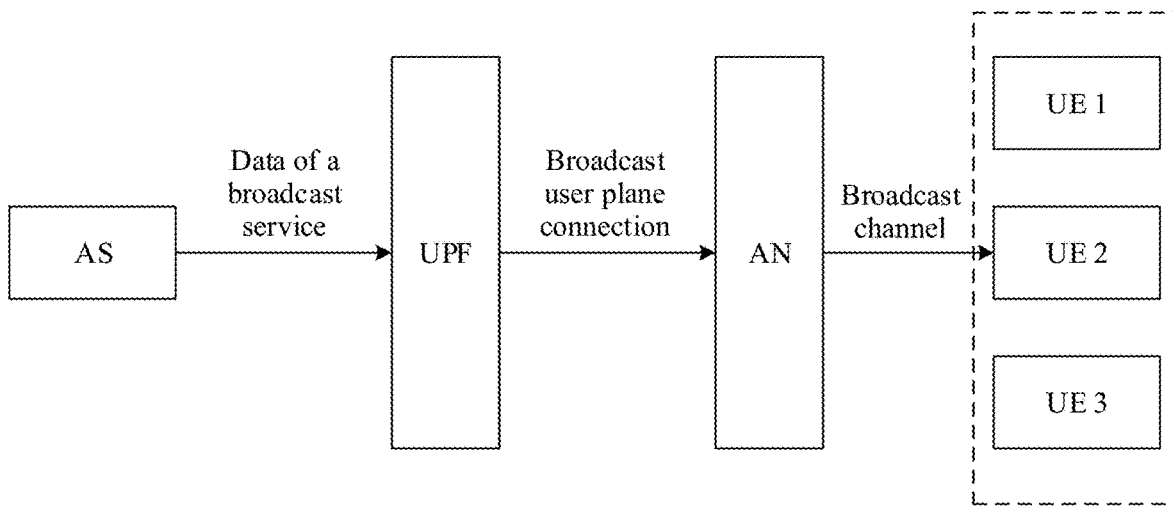
FIG. 3B is a schematic diagram of transmitting data of a broadcast service by using a broadcast transmission mechanism in the conventional technology.

For a broadcast service, the application server needs to transmit same data to all terminals that request data of the service. FIG. 3B is a schematic diagram of transmitting data of a broadcast service by using a broadcast transmission mechanism in the conventional technology. As shown in FIG. 3B, when an AS sends the data of the broadcast service to a plurality of terminals, a broadcast QoS flow needs to be established between a UPF and a group of terminals, and includes a broadcast user plane connection established between the UPF and an AN, and a broadcast channel established between the AN and the UE that receives the data of the broadcast service. For example, data received by UE 1, UE 2, and UE 3 is the same. The AS sends the data of the broadcast service to the UE 1, the UE 2, and the UE 3 through the established broadcast QoS flow.

Figure 4:
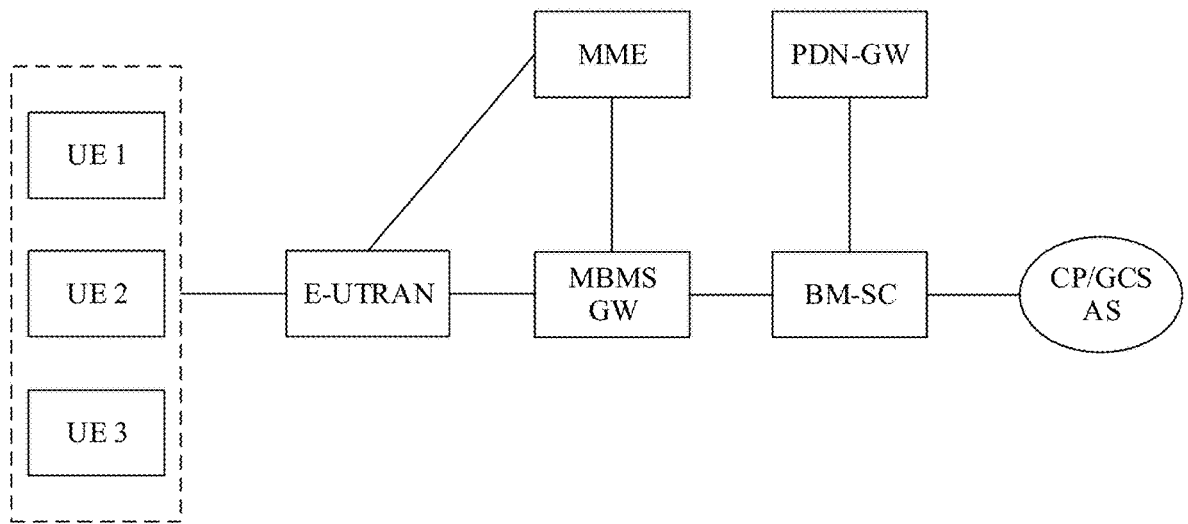
FIG. 4 shows a broadcast/multicast transmission mechanism in an existing 4G system.

FIG. 4 shows a broadcast/multicast transmission mechanism in an existing 4G system. When an external server (also referred to as a content provider (CP)) or a group communication service application server (GCS AS) needs to send data of a broadcast service, the external server requests a broadcast/multicast service center (BM-SC) network element to activate a broadcast bearer. Then, the BM-SC triggers a broadcast session establishment or modification procedure, and establishes a broadcast bearer including the BM-SC to a multimedia broadcast multicast service gateway (MBMS GW) to an evolved universal terrestrial radio access network (E-UTRAN) and an air interface broadcast channel. When the external server sends the data of the broadcast service, the external server sends the data of the broadcast service to the BM-SC. In this case, the data of the broadcast service is carried over the broadcast bearer and sent to a group of terminals (for example, UE 1, UE 2, and UE 3) corresponding to the data of the broadcast service. For functions of a mobility management entity (MME) and a packet data network gateway (PDN-GW) shown in FIG. 2, refer to related descriptions in the conventional technology.

An existing 5G network system supports only a unicast transmission manner, but does not support a broadcast transmission manner. To transmit the data of the broadcast service between the application server and the terminal, in an existing 4G broadcast transmission manner, a broadcast QoS flow needs to be established in the UPF for a group of terminals or an area in the 5G system, and includes a broadcast user plane connection established between the UPF and the access network device, and a broadcast channel established between the access network device and the terminal that receives the data of the broadcast service. The broadcast channel is reserved based on a resource. Once an air interface resource on the broadcast channel is allocated, the air interface resource on the broadcast channel cannot be allocated to another unicast air interface for use even if there is no data transmission. In addition, when the service data received by the terminal is switched between unicast transmission and broadcast transmission, a new signaling switching procedure is introduced, resulting in a long data transmission delay.

In addition, the terminal that requests the data of the broadcast service further needs to support protocol stacks dedicated to the broadcast transmission manner, and the protocol stacks may be implemented on a chip. UE that supports unicast transmission in the conventional technology may not support the broadcast transmission manner. In this case, the terminal cannot receive the service data transmitted through broadcast. A broadcast transmission mechanism in the conventional technology increases costs of the terminal. This leads to low transmission efficiency.

To resolve the foregoing problem, an embodiment of this application provides a data transmission method, to efficiently transmit the data of the broadcast service by reusing and extending a unicast transmission mechanism in the 5G network system, so as to avoid a signaling procedure for establishing a broadcast channel and implementing broadcast transmission. This reduces a data transmission delay, and improves use efficiency of resources on an air interface side and a core network side. It should be understood that, the following embodiments describe data transmission methods in the embodiments of this application by using a multicast service as an example. Multicast in the following embodiments may be replaced with broadcast.

Based on the network architecture shown in FIG. 1, the following describes in detail the method in the embodiments of this application from a perspective of interaction between an application server, a user plane function network element, an access network device, and a terminal. The following several embodiments may be combined with each other, and a same or similar concept or process may not be described again in some embodiments.

Figure 5:
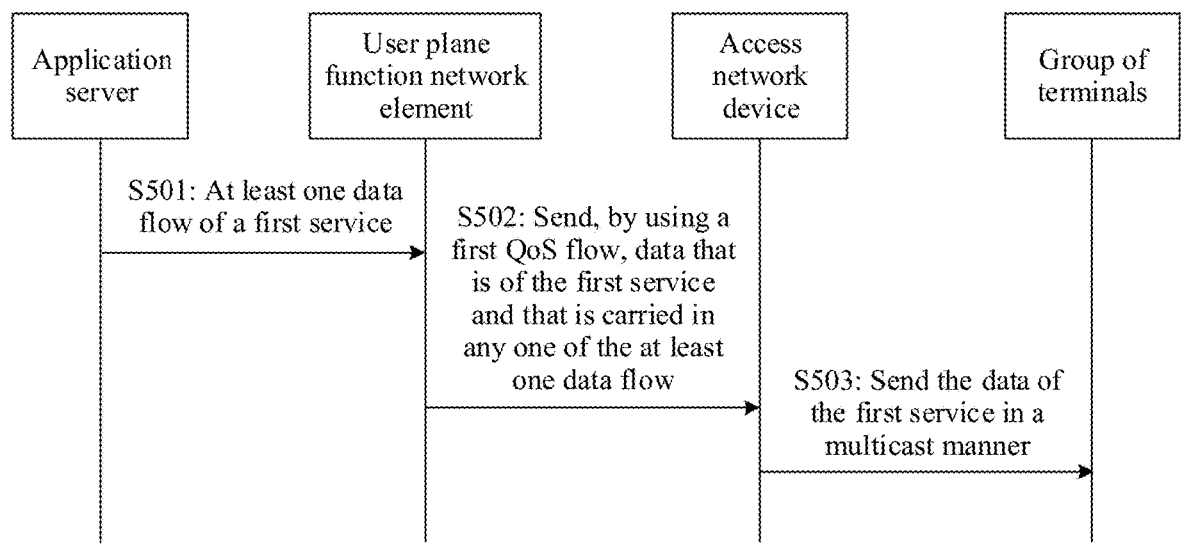
FIG. 5 is a schematic flowchart of an embodiment of a data transmission method according to an embodiment of this disclosure.

FIG. 5 is a schematic flowchart of an embodiment of a data transmission method according to an embodiment of this application. As shown in FIG. 5, the data transmission method includes the following steps.

S501: An application server sends at least one data flow of a first service to a user plane function network element.

The first service may be a multicast service. There may be one or more user plane function network elements. This is not limited.

Correspondingly, the user plane function network element receives the at least one data flow of the first service.

The data flow of the first service may include data of the first service.

S502: The user plane function network element sends the data that is of the first service and that is in any one of the at least one data flow to an access network device by using a first QoS flow.

S503: The access network device sends, in a multicast manner, the data of the first service to a group of terminals corresponding to the data of the first service, where the group of terminals includes a first terminal.

In S501, correspondingly, the user plane function network element receives the at least one data flow of the first service from the application server.

It should be noted that the first QoS flow in the embodiments of this application may include a common QoS flow between the access network device and the user plane function network element or a QoS flow of the first terminal, and both the access network device and the user plane function network element are nodes in the QoS flow of the first terminal. It should be understood that the QoS flow of the first terminal includes an N3 connection part between the user plane function network element and the access network device, and a data radio bearer DRB part between the access network device and the terminal device. The first QoS flow may be one QoS flow. The first terminal is one terminal in the group of terminals mentioned in step S503.

It should be understood that the first QoS flow in this embodiment of this application and the following embodiments may refer to the N3 connection part between the user plane function network element and the access network device shown in FIG. 1.

In this embodiment of this application, the first service is the multicast service. It should be understood that the first service in this embodiment of this application may be replaced with the multicast service. The multicast service is used for description in the following embodiments.

When data requested by a plurality of terminals from the application server is the data of the first service, because the data requested by the plurality of terminals is the same, the application server may send the at least one data flow (IP flow) of the first service to the user plane function network element. Each of the at least one data flow is used to carry the data of the first service. It should be understood that the first service may be a service such as a live audio and video service (a concert, a sports event, or a game), a group communication service, a vehicle-to-everything (V2X) service, or an internet of things (JOT) service. The data flow may also be represented as a service data flow (SDF) or a data packet flow.

The data of the first service in this embodiment of this application may include application layer data (Payload) of the first service, but does not include a transport layer packet header used to transmit the application layer data. Alternatively, when multicast communication is performed between the first service and a client of the first service (that is, multicast communication is performed at an application layer), the data of the first service may include application layer data of the first service and a transport layer packet header used to transmit the application layer data. A transport layer includes a communications protocol layer below the application layer, and may be a transmission control protocol (TCP)/user datagram protocol (UDP) layer, and/or an IP layer.

In a possible implementation of step S501, the application server may send, to the user plane function network element, the data that is of the first service and that is requested by each terminal. To be specific, the application server sends a plurality of data flows of the first service to the user plane function network element, where the plurality of data flows are in a one-to-one correspondence with terminals that request the data of the first service. Each data flow carries the data of the first service, and a quantity of data flows may be the same as a quantity of terminals that request the data of the first service. In this scenario, optionally, the application server may use a unicast IP address of the terminal as a destination IP address for transmitting the data of the first service, and the application server sends, to the user plane function network element by using an IP routing mechanism, a data packet in which the data of the first service is encapsulated. For example, a destination IP address of the data packet corresponding to the data that is of the first service and that is in the data flow sent by the application server to UE 1 is a unicast IP address of the UE 1. Optionally, the application server may further use a multicast address as a destination IP address for transmitting the data of the first service, and the application server sends, to the user plane function network element through a tunnel or in an IP-in-IP transmission manner, a data packet in which the data of the first service is encapsulated. In this case, an outer destination IP address of the data packet is an IP address of a UPF, and an inner destination IP address of the data packet is a multicast IP address. For example, the inner destination IP address of the data packet corresponding to the data that is of the first service and that is in the data flow sent by the application server to the UE 1 is the multicast IP address, and the outer destination IP address of the data packet is the IP address of the UPF. Optionally, the application server may further use a multicast address as a destination IP address for transmitting the data of the first service, and the application server sends, to the user plane function network element through a tunnel or in an IP-in-IP transmission manner, a data packet in which the data of the first service is encapsulated. In this case, an outer destination IP address of the data packet is an IP address of a terminal. For example, an inner destination IP address of the data packet corresponding to the data that is of the first service and that is in the data flow sent by the application server to the UE 1 is a multicast IP address, and the outer destination IP address of the data packet is the IP address of the UE 1. When the application server sends, to the user plane function network element through the tunnel, the data packet in which the data of the first service is encapsulated, a peer address of the tunnel is a tunnel identifier of the user plane function network element.

In another possible implementation of step S501, because the data requested by the plurality of terminals is the data of the first service, the application server may send one data flow of the first service to the user plane function network element. Optionally, the application server sets, to a first multicast IP address, the destination IP address that is of the data packet and that is used to transmit the data of the first service, and the application server may send the data of the first service to the user plane function network element in an IP multicast manner. In this case, the UPF may also join the multicast address to receive the data of the first service. The first multicast address indicates that a plurality of terminals receive the data of the first service at the multicast address. The first multicast address may be a multicast address negotiated by the application server and the terminal, or a multicast address determined by the application server to be configured on the terminal. Optionally, the application server may further send one data flow of the first service to the UPF through a tunnel or in an IP-in-IP transmission manner. To be specific, an inner IP address of a data packet corresponding to the data flow is a first multicast address that is of the data packet and that is used to transmit the data of the first service, and an outer IP address is a unicast address of the UPF or a second multicast address that is of the data packet and that is used by the UPF to receive the data of the first service. When the application server sends, to the user plane function network element through the tunnel, the data packet in which the data of the first service is encapsulated, a peer address of the tunnel is a tunnel identifier of the user plane function network element. A manner in which the application server sends the data of the first service to the user plane function network element is not limited in this embodiment of this application.

Corresponding to S502, the access network device receives the data that is of the first service and that is carried in the first QoS flow.

It may be understood that, when the data requested by the plurality of terminals from the application server is the data of the first service, each of the plurality of terminals may establish an independent QoS flow (which may be understood as a unicast QoS flow between the terminal and the first service) that is of the terminal and that is used to carry the data of the first service. N3 connection parts between user plane function network elements and access network devices that correspond to QoS flows are also independent of each other. It should be understood that, for a specific process of establishing the QoS flow, refer to related descriptions in the conventional technology. It should be understood that the QoS flow that corresponds to the plurality of terminals and that is used to carry the data of the first service is a QoS flow that corresponds to each of the plurality of terminals and that is used to carry the data of the first service.

In this embodiment of this application, the user plane function network element may send the data that is of the first service and that is in any one of the at least one data flow to the access network device by using the first QoS flow, to improve use efficiency of resources on a core network side.

In an example of step S502, when the user plane function network element sends the data of the first service, assuming that the user plane function network element receives at least two data flows from the application server, the user plane function network element sends the data that is of the first service and that is in any one of the at least two data flows to the access network device only by using the first QoS flow.

S503 may be replaced as follows: The access network device sends, in a multicast manner, the data of the first service to the plurality of terminals that request the data of the first service. It should be understood that, in this embodiment of this application, descriptions are provided from a perspective of interaction between the access network device and a user plane function network element (for example, a first user plane function network element). Correspondingly, the first QoS flow received by the access network device is a common QoS flow between the access network device and the first user plane function network element or a QoS flow of a first terminal. It should be understood that, in this embodiment of this application, the group of terminals corresponding to the data of the first service may be a plurality of terminals that are served by the first user plane function network element (provides a transmission service for a corresponding group of terminals) and that request the data of the first service. A person skilled in the art may understand that the first user plane function network element serving the group of terminals may be predetermined by a session management function network element.

The access network device may send, in a multicast manner through a unicast channel pre-established between the access network device and the terminal, the data of the first service to the corresponding group of terminals that request the data of the first service. The multicast manner may be specifically understood as a multicast scheduling manner. The access network device uses the multicast scheduling manner for an air interface resource.

In a possible implementation of step S503, the access network device may send a group radio network temporary identifier (G-RNTI) of the group of terminals to the terminal through a unicast channel corresponding to each terminal in the group of terminals, where the G-RNTI of the group of terminals may be used to schedule the data of the first service to the group of terminal devices. Optionally, the G-RNTI of the group of terminals may be carried in a radio resource control (RRC) message.

In this embodiment of this application, the access network device schedules the data of the first service to the group of terminals by using the G-RNTI.

According to the data transmission method provided in this embodiment of this application, the user plane function network element may transmit the data of the multicast service through an established unicast user plane connection, for example, the QoS flow of the terminal or the common QoS flow, and does not need to additionally establish a multicast (broadcast in the conventional technology) user plane connection, to reduce a data transmission delay, and when sending the data of the first service to the access network device, the user plane function network element sends only the data that is of the first service and that is carried in one data flow, to improve use efficiency of resources on a core network side. In addition, after receiving the data that is of the first service and that is in the first QoS flow, the access network device can send, in a multicast manner through an established unicast channel, the data of the first service to the group of terminals corresponding to the data of the first service, and does not need to additionally establish a multicast channel and switch to the multicast channel, to further reduce a data transmission delay.

The foregoing embodiment describes that the access network device receives the data that is of the first service and that is sent by one user plane function network element. It may be understood that the access network device may receive the data that is of the first service and that is sent by at least two user plane function network elements. It should be understood that, in an implementation scenario of this embodiment of this application, descriptions are provided by using an example in which the access network device receives the data that is of the first service and that is sent by two user plane function network elements. The two user plane function network elements include a first user plane function network element and a second user plane function network element.

In this scenario, S501 may be replaced as follows: The application server sends the at least one data flow of the first service to each of the first user plane function network element and the second user plane function network element. Correspondingly, the first user plane function network element receives the at least one data flow from the application server, and the second user plane function network element receives the at least one data flow from the application server.

In this scenario, the method may further include: The second user plane function network element sends the data that is of the first service and that is in any one of the at least one data flow to the access network device by using a second QoS flow.

It should be noted that the second QoS flow in the embodiments of this application includes a common QoS flow between the access network device and the second user plane function network element or a QoS flow of a second terminal. Both the access network device and the second user plane function network element are nodes in the QoS flow of the second terminal. The second terminal may be one terminal in the group of terminals mentioned in step S503. Alternatively, the second terminal may be a terminal in a second group of terminals corresponding to the data that is of the first service and that is carried in the second QoS flow, but does not belong to the group of terminals mentioned in step S503. For a specific implementation in this embodiment of this application, refer to related descriptions of S906 in the following embodiment.

In this embodiment of this application, when the access network device receives the data that is of the first service and that is sent by both the two user plane function network elements, correspondingly, the access network device in S503 may send, in a multicast manner, the data of the first service to the group of terminals corresponding to the data of the first service. It should be understood that the group of terminals in this embodiment of this application may include: a first group of terminals corresponding to the first QoS flow; or a second group of terminals corresponding to the second QoS flow; or a set of the first group of terminals and the second group of terminals.

The group of terminals may alternatively be replaced with a first group of terminals corresponding to the data that is of the first service and that is carried in the first QoS flow, a second group of terminals corresponding to the data that is of the first service and that is carried in the second QoS flow, or a set of the first group of terminals and the second group of terminals.

Specifically, the application server may send the at least one data flow of the first service to each of the first user plane function network element and the second user plane function network element in a manner shown in FIG. 6A, FIG. 6B, FIG. 7A, or FIG. 7B.

Figure 6A:
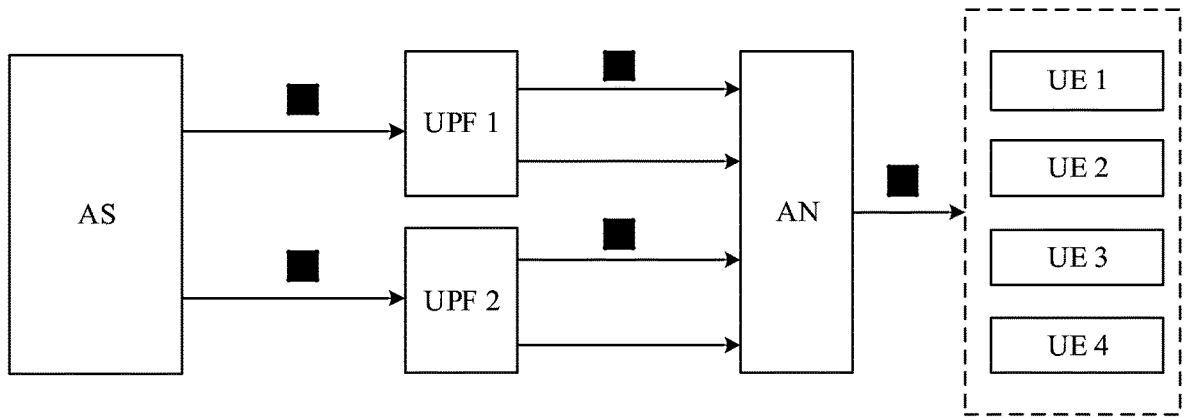
FIG. 6A is a schematic diagram 1 of a scenario of a data transmission method according to an embodiment of this disclosure.

For example, FIG. 6A is a schematic diagram 1 of a scenario of a data transmission method according to an embodiment of this application. In this embodiment of this application, the application server may send, to the user plane function network element, the data that is of the first service and that is requested by each terminal. To be specific, the application server sends a plurality of data flows of the first service to the user plane function network element, where the plurality of data flows are in a one-to-one correspondence with terminals that request the data of the first service.

As shown in FIG. 6A, terminals that request the data of the first service include UE 1, UE 2, UE 3, and UE 4. There are two user plane function network elements configured to send the data of the first service: a UPF 1 and a UPF 2. A user plane function network element serving the UE 1 and the UE 2 is the UPF 1, and a user plane function network element serving the UE 3 and the UE 4 is the UPF 2. The application server AS sends one data flow of the first service to the UPF 1, and sends one data flow of the first service to the UPF 2. It should be understood that a black square in the figure represents the data of the first service.

Figure 7A:
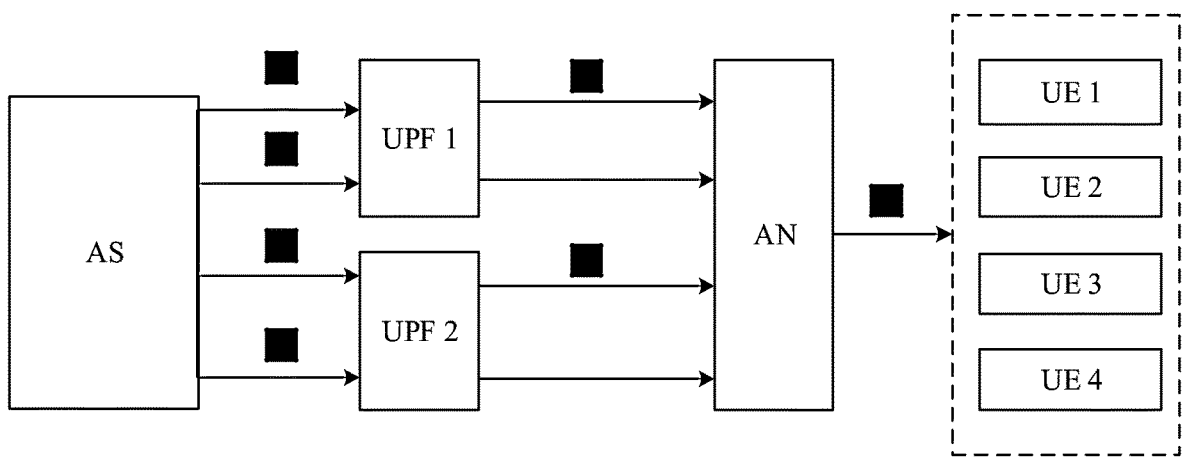
FIG. 7A is a schematic diagram 2 of a scenario of a data transmission method according to an embodiment of this disclosure.

FIG. 7A is a schematic diagram 2 of a scenario of a data transmission method according to an embodiment of this application. In this embodiment of this application, the application server may send one data flow of the first service to the user plane function network element. As shown in FIG. 7A, the AS sends, to the UPF 1, a data flow corresponding to the data that is of the first service and that is requested by each UE, that is, the AS sends two data flows of the first service to the UPF 1. Correspondingly, the AS in FIG. 7A also sends two data flows of the first service to the UPF 2.

Figure 6B:
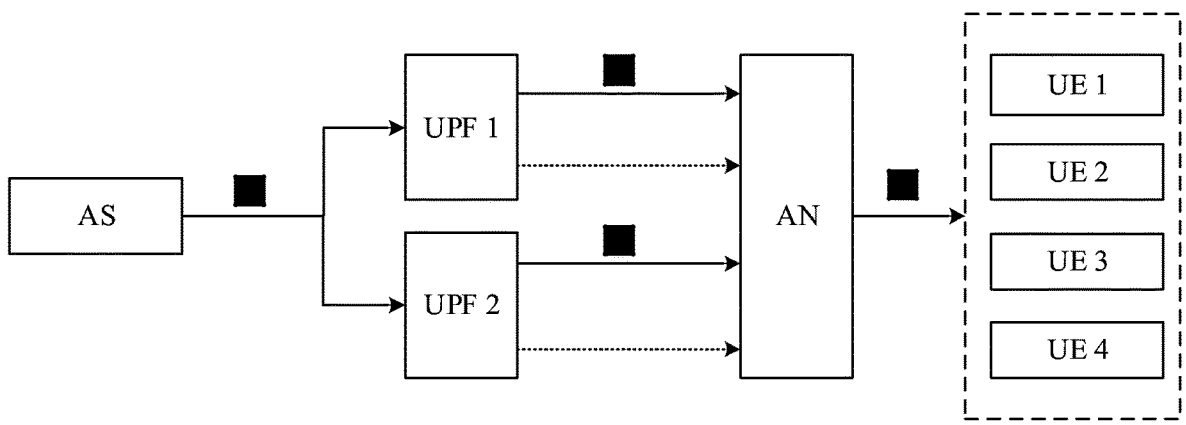
FIG. 6B is a schematic diagram 3 of a scenario of a data transmission method according to an embodiment of this disclosure.
Figure 7B:
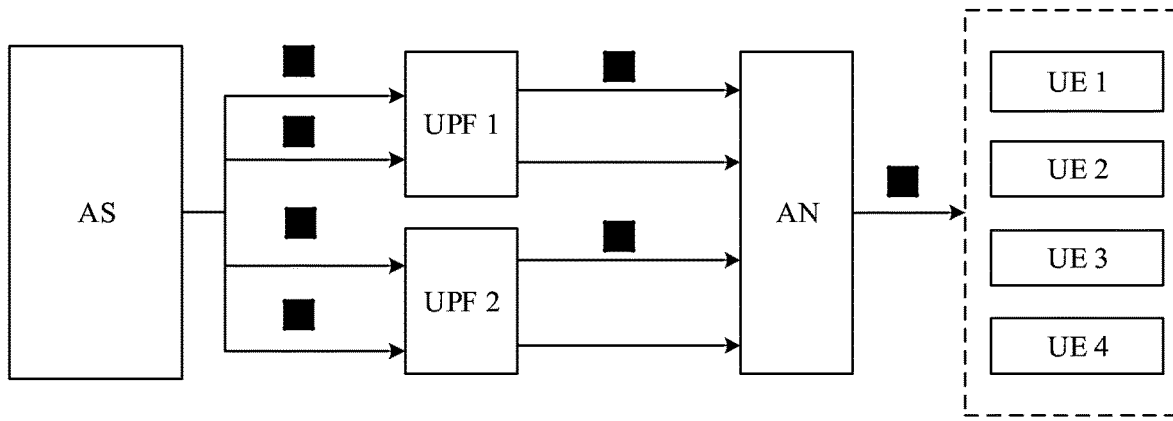
FIG. 7B is a schematic diagram 4 of a scenario of a data transmission method according to an embodiment of this disclosure.

FIG. 6B is a schematic diagram 3 of a scenario of a data transmission method according to an embodiment of this application. Corresponding to FIG. 6A, FIG. 6B shows that the AS may further send one data flow of the first service to both the UPF 1 and the UPF 2. FIG. 7B is a schematic diagram 4 of a scenario of a data transmission method according to an embodiment of this application. Corresponding to FIG. 7A, FIG. 7B shows that the AS may further simultaneously send two data flows of the first service to each of the UPF 1 and the UPF 2.

It may be understood that, in this embodiment of this application, when the application server sends the data flow of the first service to a plurality of user plane function network elements, rules for sending the data flow of the first service for the user plane function network elements may be different. For example, as shown in FIG. 7B, the AS may send one data flow of the first service (sending of per UPF) to the UPF 1, and send two data flows of the first service (sending of per terminal) to the UPF 2.

As shown in FIG. 6A, the UPF 1 is used as an example. When receiving one data flow from the AS, the UPF 1 may send the data that is of the first service and that is in the data flow to the access network device by using a QoS flow of the UE 1. The QoS flow of the UE 1 is a QoS flow that is of the UE 1 and that is used to transmit the data of the first service. As shown in FIG. 7A, when receiving two data flows from the AS, the UPF 1 may send the data that is of the first service and that is in any one of the two data flows to the access network device by using a QoS flow of the UE 1. An example in which the first QoS flow is the QoS flow of the first terminal is used in FIG. 6A and FIG. 7A. Usually, the UPF 1 uses either the QoS flow of the UE 1 or the common QoS flow, but does not use both the QoS flow of the UE 1 and the common QoS flow.

It may be understood that, in this embodiment of this application, when the application server sends the data flow of the first service to a plurality of user plane function network elements, rules for sending the data flow of the first service for the user plane function network elements may be different or the same. For example, as shown in FIG. 7A, the AS may send one data flow of the first service to the UPF 1, and send two data flows of the first service to the UPF 2.

For descriptions of the first group of terminals corresponding to the first QoS flow, the second group of terminals corresponding to the second QoS flow, and the set of the first group of terminals and the second group of terminals in this embodiment of this application, refer to related descriptions of S907 in the following embodiment.

In this embodiment of this application, when receiving the data that is of the first service and that is carried in the first QoS flow from the first user plane function network element and the data that is of the first service and that is carried in the second QoS flow from the second user plane function network element, the access network device may send the data of the first service to the group of terminals corresponding to the data of the first service, where the group of terminals may be the first group of terminals corresponding to the first QoS flow, the second group of terminals corresponding to the second QoS flow, or the set of the first group of terminals and the second group of terminals. Further, in this embodiment of this application, the access network device may send, to the group of terminals, the data that is of the first service and that is carried in the first QoS flow or the second QoS flow, and perform optimized transmission on the data, to improve use efficiency of resources on an air interface side.

The foregoing embodiment describes a scenario in which the application server sends the at least one data flow to the user plane function network element, and the user plane function network element sends, to the access network device, the data that is of the first service and that is carried in the first QoS flow. Corresponding to the foregoing scenario, the access network device may send, in a multicast manner through an established unicast channel, the data of the first service to the group of terminals corresponding to the data of the first service.

Figure 8:
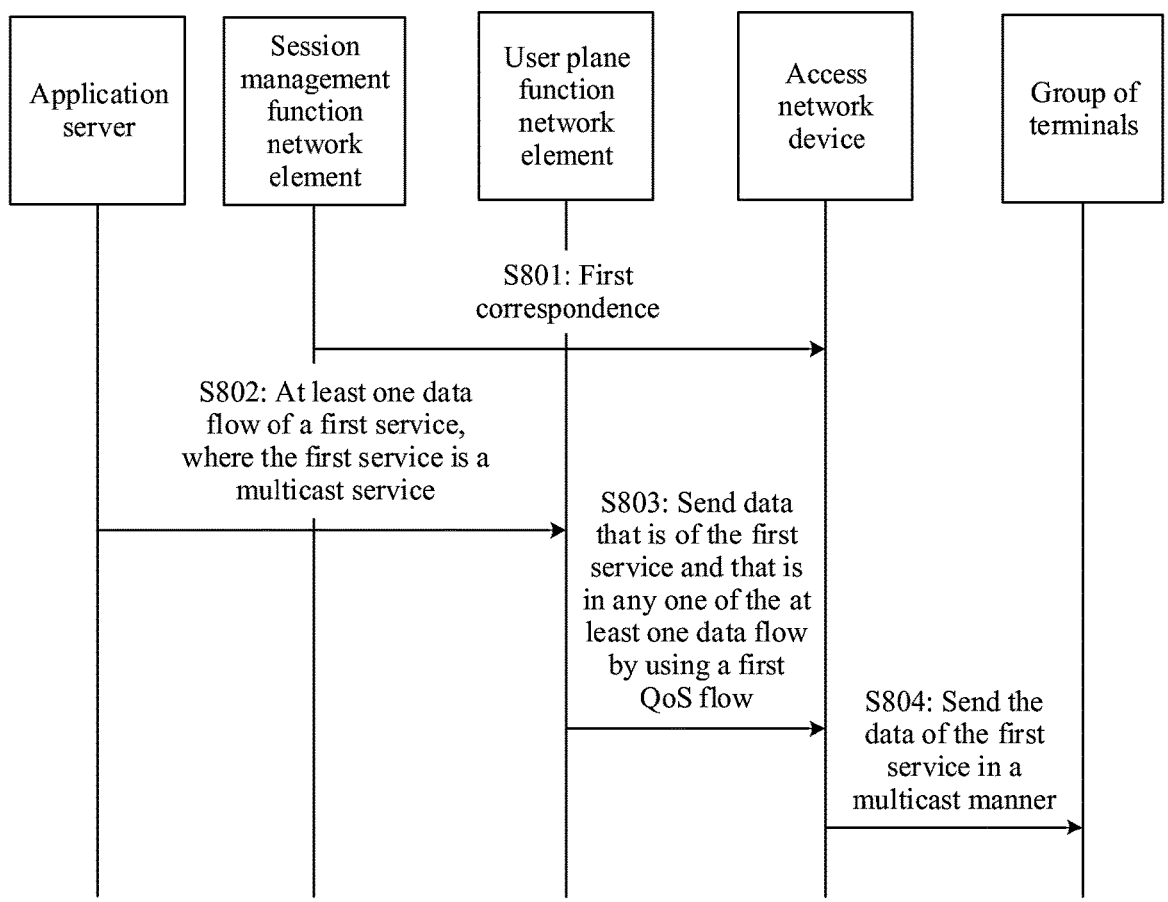
FIG. 8 is a flowchart of another embodiment of a data transmission method according to an embodiment of this disclosure.

According to the foregoing embodiment, how the access network device determines the group of terminals corresponding to the data of the first service in this embodiment of this application is described below with reference to FIG. 8. FIG. 8 is a schematic flowchart of another embodiment of a data transmission method according to an embodiment of this application. As shown in FIG. 8, the data transmission method may include the following steps:

S801: An access network device receives a first correspondence.

S802: An application server sends at least one data flow of a first service to a user plane function network element, where the first service is a multicast service.

S803: The user plane function network element sends data that is of the first service and that is in any one of the at least one data flow to the access network device by using a first QoS flow.

S804: The access network device sends the data of the first service to a group of terminals in a multicast manner.

It should be understood that, for implementations of S802, S803, and S804 in this embodiment of this application, refer to related descriptions of S501, S502, and S503 in the foregoing embodiment. Details are not described herein again.

In S801, the first correspondence may be used to indicate the group of terminals mentioned in step S804.

Optionally, the first correspondence may be sent by a session management function network element, that is, the access network device may receive the first correspondence from the session management function network element. In this case, based on the network architecture shown in FIG. 1, the first correspondence may be sent by the SMF network element to the access network device by using the AMF network element. Alternatively, the first correspondence may be carried in a session management message sent by the SMF network element to the access network device, and sent by the AMF network element to the access network device.

Optionally, after receiving a QoS flow establishment request from a first terminal or a server of the first service, the session management function network element may generate the first correspondence, where the QoS flow establishment request indicates to establish the first QoS flow.

In this scenario, after receiving the QoS flow establishment request from the first terminal, the session management function network element may further generate the first correspondence based on service identification information corresponding to a QoS flow that the first terminal requests to establish. The service identification information is used to indicate that the QoS flow is used to transmit a multicast service. The service identification information may include a temporary group identity (that is, another concept equivalent to a 4G temporary mobile group identity (TMGI)), description information of the first service indicates that the first service is a multicast service, or a source IP address or a destination IP address corresponding to the first service is a multicast address. The session management function network element generates the first correspondence when determining, based on the service identification information, that the first service is the multicast service and that optimized transmission can be performed. Optionally, the service identification information may be carried in the QoS flow establishment request.

Optionally, the service identification information may include identification information of the first service, a 3-tuple of the first service, and/or a 4-tuple of the first service. The identification information of the first service is used to indicate that the first service is the multicast service. For example, the identification information of the first service is football live 1. The session management function network element may determine, based on the football live 1, that the first service is the multicast service. The 3-tuple of the first service includes a communications protocol, a server IP address, and a port number. The session management function network element may determine, based on the server IP address and the port number in the 3-tuple, that the first service is the multicast service. The 4-tuple of the first service includes a communications protocol, a server IP address, a port number, and a multicast address, and the multicast address may be an address that is of a group of terminals and that is used to receive the data of the first service. Correspondingly, the session management function network element may determine, based on the 4-tuple, that the first service is the multicast service.

Optionally, the session management function network element may also generate the first correspondence after receiving a QoS flow establishment request from a group of terminals and determining that the group of terminals requests the data of the first service.

It should be understood that the QoS flow establishment request of the terminal may be a PDU session establishment/modification request sent by the terminal to the session management function network element.

In this embodiment of this application, before the access network device sends, in a multicast manner, the data of the first service to the group of terminals corresponding to the data of the first service, the method may further include: The access network device determines, based on the first QoS flow and the first correspondence, the group of terminals corresponding to the data of the first service.

The following describes the first correspondence provided in this embodiment of this application and a specific manner in which the access network device determines, based on the first QoS flow and the first correspondence, the group of terminals corresponding to the data of the first service.

(1) The first correspondence may include a correspondence between the first QoS flow and the group of terminals. In this scenario, the session management function network element may generate the correspondence between the first QoS flow and the group of terminals after receiving a QoS flow establishment request from each terminal in the group of terminals and determining that the group of terminals requests the data of the first service. The group of terminals includes a first terminal.

The correspondence between the first QoS flow and the group of terminals includes a correspondence between identification information of the first QoS flow and identification information and/or tunnel information of a QoS flow of each terminal in the group of terminals. The identification information of the first QoS flow may be an identifier QFI of the first QoS flow, the identification information of the QoS flow of each terminal may also be a QFI of the QoS flow, and the tunnel information of the QoS flow of each terminal may be, for example, an access network device side tunnel identifier AN_Tunnel_ID, a core network side tunnel identifier CN_Tunnel_ID, and/or a terminal side tunnel identifier UE_Tunnel_ID. After receiving the data that is of the first service and that is carried in the first QoS flow, the access network device may determine, based on the correspondence between the identification information of the first QoS flow and the identification information and/or tunnel information of the QoS flow of each terminal in the group of terminals, the group of terminals corresponding to the data of the first service.

For example, a correspondence between the identification information of the first QoS flow and the identification information of the QoS flow of each terminal in the group of terminals may be shown in Table 2, and a correspondence between the identification information of the first QoS flow and the tunnel information of the QoS flow of each terminal in the group of terminals is shown in Table 3.

TABLE 2

| Identification information of a first QoS flow | Identification information of a QoS flow of each terminal |
| --- | --- |
| QFI_1-1/QFI-C1 | QFI_1-1<br>QFI_1-2<br>QFI_1-3<br>QFI_1-4 |

As shown in Table 2, after receiving the data that is of the first service and that is carried in the first QoS flow, the access network device may determine, based on the correspondence between the identification information of the first QoS flow and the identification information of the QoS flow of each terminal in the group of terminals, the group of terminals corresponding to the data that is of the first service and that is carried in the first QoS flow. Specifically, the group of terminals determined based on the identification information of the QoS flow of each terminal in the group of terminals may include a terminal (a first terminal) corresponding to a QoS flow whose identifier is QFI_1-1, a terminal (a second terminal) corresponding to a QoS flow whose identifier is QFI_1-2, a terminal (a third terminal) corresponding to a QoS flow whose identifier is QFI_1-3, and a terminal (a fourth terminal) corresponding to a QoS flow whose identifier is QFI_1-4. It should be understood that the identification information of the first QoS flow may be identification information QFI_1-1 of the QoS flow of the first terminal, or identification information QFI-C1 of the common QoS flow.

TABLE 3

| Identification information of a first QoS flow | Tunnel information of a QoS flow of each terminal |
| --- | --- |
| QFI_1-1/QFI-C1 | UE_Tunnel_a<br>UE_Tunnel_b<br>UE_Tunnel_c<br>UE_Tunnel_d |

As shown in Table 3, after receiving the identification information of the first QoS flow and the tunnel information of the QoS flow of each terminal in the group of terminals, the access network device may determine the group of terminals corresponding to the data that is of the first service and that is carried in the first QoS flow. Specifically, the group of terminals determined based on the tunnel information of the QoS flow of each terminal in the group of terminals may include a terminal (for example, a first terminal) whose identifier is UE_Tunnel_a, a terminal (for example, a second terminal) whose identifier is UE_Tunnel_b, a terminal (for example, a third terminal) whose identifier is UE_Tunnel_c, and a terminal (for example, a fourth terminal) whose identifier is UE_Tunnel_d.

(2) The first correspondence may include a correspondence between the first QoS flow and any terminal in the group of terminals.

In this case, after receiving a QoS flow establishment request from the first terminal or the application server, the session management function network element may establish the correspondence between the first QoS flow and the any terminal in the group of terminals. Alternatively, after receiving a QoS flow establishment request from each terminal in the group of terminals and determining that the group of terminals requests the data of the first service, the session management function network element may generate the correspondence between the first QoS flow and the group of terminals.

After receiving the data that is of the first service and that is carried in the first QoS flow, the access network device may determine, based on the correspondence between the first QoS flow and the any terminal in the group of terminals, the group of terminals corresponding to the data of the first service.

Optionally, after receiving the QoS flow establishment request from the first terminal or the application server, the session management function network element may establish a correspondence between the first QoS flow and the first terminal. After receiving a QoS flow establishment request from a third terminal and determining that both data requested by the third terminal and data requested by the first terminal are the data of the first service, the session management function network element may establish a correspondence between the first QoS flow and the third terminal. According to the method, the session management function network element may establish the correspondence between the first QoS flow and each terminal in the group of terminals corresponding to the data of the first service.

After receiving the first correspondence between the first QoS flow and each terminal in the group of terminals from the session management function network element, the access network device may determine the group of terminals based on the first correspondence. For example, if the access network device determines, based on the received correspondence, that there is a correspondence between the any terminal and the first QoS flow, the access network device may determine, based on the correspondence, the group of terminals corresponding to the data that is of the first service and that is carried in the first QoS flow.

The correspondence between the first QoS flow and the any terminal in the group of terminals includes a correspondence between identification information of the first QoS flow and identification information and/or tunnel information of a QoS flow of the any terminal in the group of terminals. For the identification information of the first QoS flow and the identification information and/or tunnel information of the QoS flow of the terminal herein, refer to related descriptions in (1). Table 4 and Table 5 respectively show a correspondence between the identification information of the first QoS flow and identification information of a QoS flow of a first terminal in the group of terminals and a correspondence between the identification information of the first QoS flow and identification information of a QoS flow of a third terminal in the group of terminals. Table 6 and Table 7 respectively show a correspondence between the identification information of the first QoS flow and tunnel information of the QoS flow of the first terminal in the group of terminals and a correspondence between the identification information of the first QoS flow and tunnel information of the QoS flow of the third terminal in the group of terminals.

TABLE 4

| Identification information of a first QoS flow | Identification information of a QoS flow of any terminal |
|---|---|
| QFI_1-1/QFI-C1 | QFI_1-1 |

TABLE 5

| Identification information of a first QoS flow | Identification information of a QoS flow of any terminal |
|---|---|
| QFI_1-1/QFI-C1 | QFI_1-3 |

TABLE 6

| Identification information of a first QoS flow | Tunnel information of a QoS flow of any terminal |
|---|---|
| QFI_1-1/QFI-C1 | UE_Tunnel_a |

TABLE 7

| Identification information of a first QoS flow | Tunnel information of a QoS flow of any terminal |
|---|---|
| QFI_1-1/QFI-C1 | UE_Tunnel_c |

For example, as shown in Table 4 and Table 5, after receiving the correspondence between the identification information of the first QoS flow and the identification information of the QoS flow of the first terminal and the correspondence between the identification information of the first QoS flow and the identification information of the QoS flow of the third terminal, the access network device may determine that the first terminal and the third terminal are terminals in the group of terminals. It should be understood that the access network device may receive in advance the correspondence between the identification information of the first QoS flow and the identification information and/or tunnel information of the QoS flow of each terminal in the group of terminals, and therefore can determine the group of terminals.

Optionally, after receiving the correspondences shown in Table 4 and Table 5, the access network device may update the identification information that is of the QoS flow of the terminal and that has the correspondence with the identification information of the first QoS flow, to obtain the first correspondence shown in Table 2. Similarly, after receiving the correspondences shown in Table 6 and Table 7, the access network device may update the tunnel information that is of the QoS flow of the terminal and that has the correspondence with the identification information of the first QoS flow, to obtain the first correspondence shown in Table 3.

(3) The first correspondence may include a correspondence between the first QoS flow and any terminal other than the first terminal in the group of terminals.

For a case of establishing the first correspondence, refer to related description of the case of establishing the first correspondence in (2).

The correspondence between the first QoS flow and the any terminal other than the first terminal in the group of terminals includes a correspondence between identification information of the first QoS flow and identification information and/or tunnel information of a QoS flow of the any terminal other than the first terminal in the group of terminals. For the identification information of the first QoS flow and the identification information and/or tunnel information of the QoS flow of the terminal, refer to related descriptions in (1).

Different from (2), in (3), assuming that the first QoS flow is a QoS flow of the first terminal, the session management function network element does not need to establish a correspondence between the first QoS flow and the first terminal, and it is considered, by default, that there is a correspondence between the first QoS flow and the first terminal. For example, Table 4 is converted into Table 8.

TABLE 8

| Identification information of a first QoS flow | Identification information of a QoS flow of any terminal other than a first terminal |
|---|---|
| QFI_1-1 | ... |

Similar to (2), after receiving the first correspondence between the first QoS flow and the any terminal other than the first terminal in the group of terminals from the session management function network element, the access network device may determine, based on the first correspondence, that there is a correspondence between the group of terminals and the first QoS flow, and determine the group of terminals based on the correspondence. It should be understood that the group of terminals may be a group of terminals in a preset time window. For details, refer to related descriptions in (2).

(4) The first correspondence may include a correspondence between the data of the first service and any terminal in the group of terminals.

For a case of establishing the first correspondence, refer to related description of the case of establishing the first correspondence in (2).

The correspondence between the data of the first service and the any terminal in the group of terminals includes a correspondence between index information of the data of the first service and identification information and/or tunnel information of a QoS flow of the any terminal in the group of terminals. For the identification information and/or tunnel information of the QoS flow of the terminal, refer to related descriptions in (1). The index information of the data of the first service is used to indicate the data of the first service. A plurality of QoS flows associated with same index information carry same data. Optionally, the index information of the data of the first service may be a number, a character string, an enumerated value, an index identifier, or the like, or may be a multicast address. The index identifier may be a value of an index ID, for example, index ID=1 or index ID=2. When index ID=1, it is used to indicate that the data that is of the first service and that is carried in the first QoS flow is data of a football live service. When index ID=2, it is used to indicate that the data that is of the first service and that is carried in the first QoS flow is data of a basketball live service.

It should be understood that, after receiving the QoS flow establishment request from the first terminal, the session management function network element may establish a correspondence between the index information of the data of the first service and identification information and/or tunnel information of a QoS flow of the first terminal. After receiving a QoS flow establishment request from a third terminal and determining that both data requested by the third terminal and data requested by the first terminal are the data of the first service, the session management function network element may establish a correspondence between the index information of the data of the first service and identification information and/or tunnel information of a QoS flow of the third terminal. According to the method, the session management function network element may establish a correspondence between the index information of the data of the first service and the identification information/tunnel information of the QoS flow of each terminal in the group of terminals.

Correspondingly, after receiving the correspondence between the index information of the data of the first service and the identification information and/or tunnel information of the QoS flow of the first terminal and the correspondence between the index information of the data of the first service and the identification information and/or tunnel information of the QoS flow of the third terminal, the access network device may determine, based on the index information of the data of the first service, that the first terminal and the third terminal are terminals in the group of terminals.

It should be understood that the access network device may receive in advance the correspondence between the index information of the data of the first service and the identification information and/or tunnel information of the QoS flow of each terminal in the group of terminals, and therefore can determine the group of terminals. Table 9 and Table 10 respectively show a correspondence between the index information of the data of the first service and identification information of a QoS flow of a first terminal in the group of terminals and a correspondence between the index information of the data of the first service and identification information of a QoS flow of a third terminal in the group of terminals.

TABLE 9

| Index information of data of a first service | Identification information of a QoS flow of any terminal |
|---|---|
| index ID = 1 | QFI_1-1 |

TABLE 10

| Index information of data of a first service | Identification information of a QoS flow of any terminal |
|---|---|
| index ID = 1 | QFI_1-3 |

For example, after receiving the first correspondences shown in Table 9 and Table 10, the access network device may determine that both data that is of the service and that is requested by the first terminal corresponding to QFI_1-1 and data that is of the service and that is requested by the third terminal corresponding to QFI_1-3 are the data that is of the first service and whose index information is index ID=1, and therefore may determine that the first terminal and the third terminal belong to the group of terminals. Correspondingly, the access network device may determine the group of terminals after receiving the correspondence between the index information of the data of the first service and the identification information/or tunnel information of the QoS flow of each terminal in the group of terminals. It should be understood that the group of terminals may be a group of terminals in a preset time window. For details, refer to related descriptions in (2).

In a possible implementation of obtaining the index information of the data of the first service in this embodiment of this application, the index information of the data of the first service may be obtained by the session management function network element from a server of the first service. Optionally, when the session management function network element receives the QoS flow establishment request from the first terminal, the session management function network element can determine that the QoS flow is used to carry the data of the first service. The session management function network element may obtain the index information of the data of the first service from an application server corresponding to the data of the first service. Optionally, when the session management function network element receives a QoS flow establishment request from the application server, the application server may send, to the session management function network element, the index information of the data that is of the first service and that is carried in a QoS flow, or the index information of the data of the first service is pre-configured by the server of the first service in the session management function network element. In this case, if there are a plurality of session management function network elements corresponding to the first service, the plurality of session management function network elements have same index information.

Alternatively, the index information of the data of the first service may be obtained by the session management function network element from the group of terminals. Optionally, when the session management function network element receives a QoS flow establishment request from each terminal in the group of terminals, each terminal may send, to the session management function network element, the index information of the data that is of the first service and that is carried in a QoS flow that the terminal requests to establish.

Alternatively, the index information of the data of the first service may be generated by the session management function network element. Optionally, when receiving a QoS flow establishment request from the first terminal or the application server, the session management function network element may generate the index information of the data of the first service based on the data that is of the first service that is carried in a QoS flow. It should be understood that, if there are a plurality of session management function network elements corresponding to the first service, the plurality of session management function network elements may generate same or different index information of the data of the first service. Optionally, the session management function network element may generate the index information of the data of the first service based on service identification information or a destination multicast address of the first service.

When the first correspondence is the correspondence in (1), (2), (3), or (4), the first correspondence may further include:

(5) A correspondence between the first QoS flow and content of the data carried in the first QoS flow.

It should be understood that, when receiving the correspondence in (1), (2), (3), or (4), the access network device may determine the group of terminals corresponding to the data that is of the first service and that is carried in the first QoS flow. In this case, if the access network device also receives the data that is of the first service and that is carried in a second QoS flow from another user plane function network element, the access network device may also determine, based on the correspondence in (1), (2), (3), or (4), the group of terminals corresponding to the data that is of the first service and that is carried in the second QoS flow. In this case, the access network device cannot determine the data carried in the first QoS flow and the second QoS flow, that is, the access network device cannot determine whether the data carried in the first QoS flow and the second QoS flow is the same. It should be understood that the second QoS flow may be a common QoS flow between the another user plane function network element and the access network device or a QoS flow of a second terminal, and the another user plane function network element and the access network device are nodes in the QoS flow of the second terminal. The second QoS flow in this embodiment of this application refers to an N3 connection part between the another user plane function network element and the access network device.

In this scenario, in this embodiment of this application, the first correspondence may further include the correspondence between the first QoS flow and the content of the data carried in the first QoS flow. The correspondence between the first QoS flow and the content of the data carried in the first QoS flow includes a correspondence between identification information of the first QoS flow and identification information of the content of the data carried in the first QoS flow.

The identification information of the content of the data carried in the first QoS flow is used to represent the content of the data carried in the first QoS flow. Identification information of content of the data carried in the second QoS flow is used to represent the content of the data carried in the second QoS flow. The access network device may determine, based on the correspondence between the identification information of the first QoS flow and the identification information of the content of the data carried in the first QoS flow and a correspondence between identification information of the second QoS flow and the identification information of the content of the data carried in the second QoS flow, that the data carried in the first QoS flow and the second QoS flow is the same. In this scenario, a specific manner of processing the data carried in the first QoS flow and the second QoS flow by the access network device is described in detail in the following embodiment (for details, refer to related descriptions corresponding to FIG. 9).

In a possible implementation of obtaining the identification information of the content of the data carried in the first QoS flow in this embodiment of this application, the identification information of the content of the data carried in the first QoS flow may be obtained by the session management function network element from the server of the first service, may be obtained by the session management function network element from the group of terminals, or may be generated by the session management function network element. For a manner in which the session management function network element obtains the identification information of the content of the data carried in the first QoS flow, refer to a manner in which the session management function network element obtains the index information of the data of the first service. Details are not described herein again.

In this embodiment of this application, the session management function network element may generate the first correspondence, and send the first correspondence to the access network device. The access network device may determine, based on the first correspondence, that data of a multicast service (the first service) corresponds to a group of terminals, so that the access network device can send the data of the first service to the group of terminals in a multicast manner through an established unicast channel, to reduce a data transmission delay.

The foregoing embodiments describe that the access network device receives the data that is of the first service and that is in the first QoS flow from a user plane function network element (a first user plane function network element). The following embodiment describes, with reference to FIG. 9, a transmission manner in which the access network device receives the data that is of the first service and that is in QoS flows from at least two user plane function network elements. It should be understood that, in this embodiment of this application, descriptions are provided by using a transmission manner in which the access network device receives the data that is of the first service and that is in QoS flows from two user plane function network elements as an example.

Figure 9:
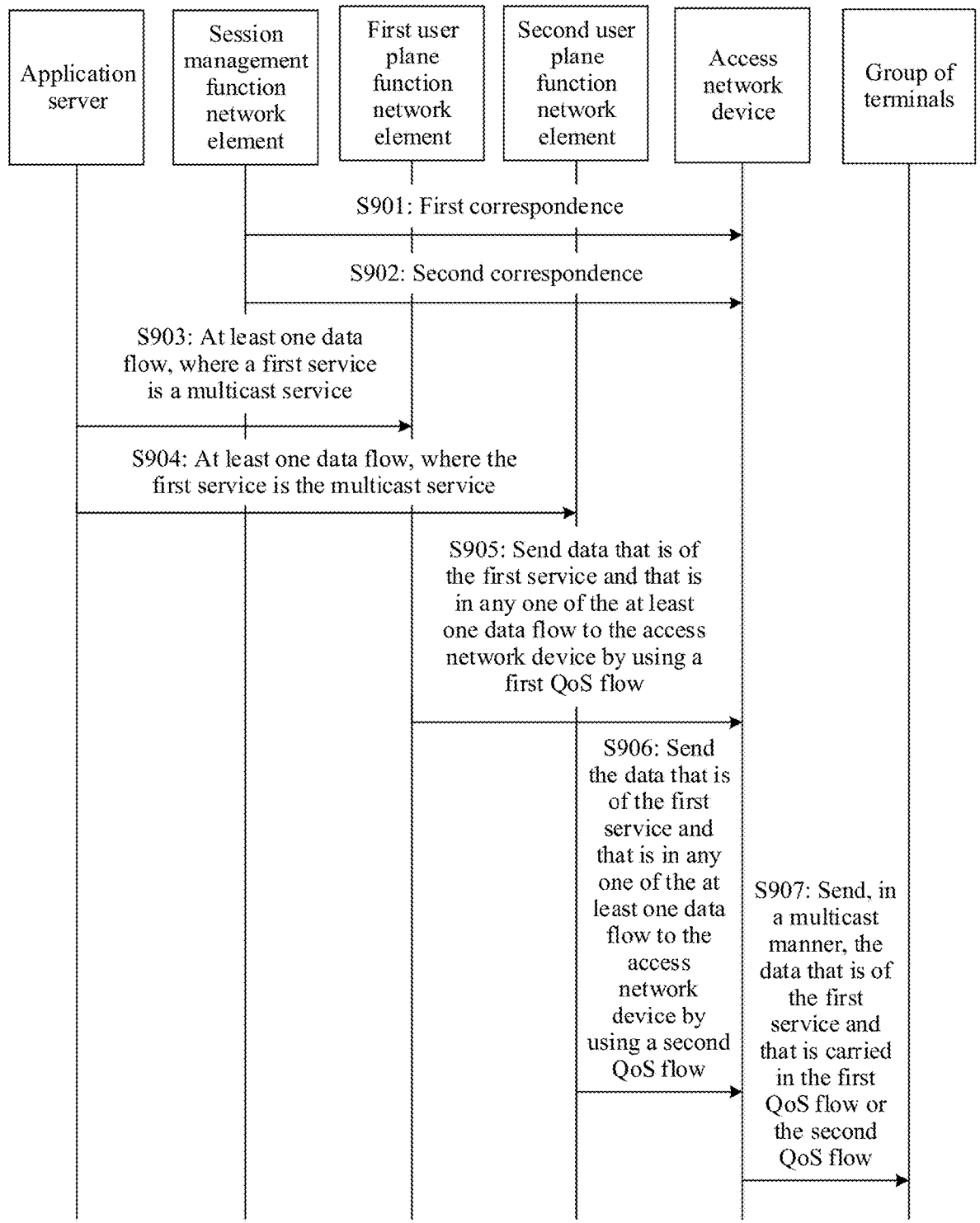
FIG. 9 is a flowchart of another embodiment of a data transmission method according to an embodiment of this disclosure.

FIG. 9 is a schematic flowchart of another embodiment of a data transmission method according to an embodiment of this application. As shown in FIG. 9, the data transmission method may include the following steps.

S901: A session management function network element sends a first correspondence to an access network device.

S902: The session management function network element sends a second correspondence to the access network device.

S903: An application server sends at least one data flow of a first service to a first user plane function network element, where the first service is a multicast service.

S904: The application server sends the at least one data flow of the first service to a second user plane function network element, where the first service is the multicast service.

S905: The first user plane function network element sends data that is of the first service and that is in any one of the at least one data flow to the access network device by using a first QoS flow.

The first QoS flow includes a common QoS flow between the access network device and the first user plane function network element or a QoS flow of a first terminal.

S906: The second user plane function network element sends the data that is of the first service and that is in any one of the at least one data flow to the access network device by using a second QoS flow.

The second QoS flow includes a common QoS flow between the access network device and the second user plane function network element or a QoS flow of a second terminal.

It should be understood that in this embodiment of this application, a sequence of S901 and S902, a sequence of S903 and S904, and a sequence of S905 and S906 are not limited. S901 and S902 may be performed simultaneously or separately, S903 and S904 may be performed simultaneously or separately, and S905 and S906 may be performed simultaneously or separately.

It should be understood that, when S905 and S906 are performed separately, time points at which the access network device receives the data that is of the first service and that is carried in the first QoS flow and the data that is of the first service and that is carried in the second QoS flow are in a preset time window. For the preset time window, refer to related descriptions in the foregoing embodiments. For implementations of S905 and S906 in this embodiment of this application, refer to related descriptions of S502 in the foregoing embodiment. Details are not described herein again.

S907: The access network device sends, to a group of terminals in a multicast manner, the data that is of the first service and that is carried in the first QoS flow or the second QoS flow.

The first correspondence is used to indicate a first group of terminals mentioned in the embodiments of this application, and the second correspondence is used to indicate a second group of terminals mentioned in the embodiments of this application. The group of terminals mentioned in step S907 may include the first group of terminals and/or the second group of terminals.

For the first correspondence in this embodiment of this application, refer to related descriptions of the first correspondence in the foregoing embodiment. It should be understood that the first correspondence in the foregoing embodiment is a correspondence that is from the first user plane function network element and that is related to the first QoS flow or data that is of the first service and that is carried in the first QoS flow. Correspondingly, when there are two user plane function network elements (for example, the first user plane function network element and the second user plane function network element) corresponding to the access network device, the access network device may further receive, from the second user plane function network element, a correspondence related to the first QoS flow or the data that is of the first service and that is carried in the first QoS flow, that is, the second correspondence.

Similar to the first correspondence, the second correspondence in this embodiment of this application may include: a correspondence between the second QoS flow and the group of terminals; or a correspondence between the second QoS flow and any terminal in the group of terminals; or a correspondence between the second QoS flow and any terminal other than the first terminal in the group of terminals; or a correspondence between the data of the first service and any terminal in the group of terminals. In addition, the second correspondence may further include a correspondence between the second QoS flow and content of the data carried in the second QoS flow. For the second correspondence, refer to related descriptions of the first correspondence.

In S906, it should be understood that both the second QoS flow and the first QoS flow are used to carry the data of the first service, that is, data carried in the second QoS flow and the first QoS flow is the data of the first service. A difference between the second QoS flow and the first QoS flow lies in that the QoS flows correspond to different user plane function network elements. The first QoS flow is the common QoS flow between the access network device and the first user plane function network element or the QoS flow of the first terminal. The second QoS flow is the common QoS flow between the access network device and the second user plane function network element or the QoS flow of the second terminal. For the second QoS flow in this embodiment of this application, refer to related descriptions of the first QoS flow in S502 in the foregoing embodiment. It should be understood that the second QoS flow may be the common QoS flow between the second user plane function network element and the access network device or the QoS flow of the second terminal, and the second user plane function network element and the access network device are nodes in the QoS flow of the second terminal. The second QoS flow in this embodiment of this application refers to an N3 connection part between the second user plane function network element and the access network device.

It should be noted that the group of terminals in the second correspondence in this embodiment of this application is a group of terminals served by the second user plane function network element. The group of terminals includes the second terminal. In addition, it should be further noted that the second terminal in this embodiment of this application is a terminal served by the second user plane function network element, and is different from the second terminal in the group of terminals served by the first user plane function network element in the foregoing embodiment.

In this embodiment of this application, after the access network device receives the data that is of the first service and that is carried in the first QoS flow and the second QoS flow, the access network device may determine, based on the first correspondence and the second correspondence, the group of terminals corresponding to the data of the first service.

The access network device can determine, based on the first correspondence, a group of terminals served by the first user plane function network element, where the group of terminals is a first group of terminals corresponding to the first QoS flow. Similarly, the access network device may also determine, based on the second correspondence, a group of terminals served by the second user plane function network element, where the group of terminals is a second group of terminals corresponding to the data that is of the first service and that is carried in the second QoS flow. For a manner in which the access network device may also determine the second group of terminals based on the first correspondence, refer to a manner in which the access network device determines the first group of terminals based on the first correspondence in the foregoing embodiment.

In this embodiment of this application, after receiving the data that is of the first service and that is carried in the first QoS flow and the second QoS flow, the access network device may perform optimized transmission on the data. To be specific, the access network device may send, to the group of terminals in a multicast manner, the data that is of the first service and that is carried in the first QoS flow or the second QoS flow.

In a possible implementation in which the access network device sends the data of the first service to the group of terminals, the group of terminals receiving the data that is of the first service and that is carried in the first QoS flow or the second QoS flow may be the first group of terminals or the second group of terminals. In this scenario, the first correspondence and the second correspondence each may include the correspondence in (1), (2), (3), or (4) in the foregoing embodiment. To be specific, the access network device can determine the first group of terminals corresponding to the data carried in the first QoS flow, and the access network device can determine the second group of terminals corresponding to the data carried in the second QoS flow. However, the access network device cannot determine that data transmitted in the first QoS flow is the same as data transmitted in the second QoS flow. Therefore, in a multicast manner, the access network device sends the data carried in the first QoS flow to the first group of terminals, and sends the data carried in the second QoS flow to the second group of terminals.

In a possible implementation in which the access network device sends the data of the first service to the group of terminals, the group of terminals receiving the data that is of the first service and that is carried in the first QoS flow or the second QoS flow may be a set of the first group of terminals and the second group of terminals. In this scenario, the first correspondence and the second correspondence each may include the correspondence in (1), (2), (3), or (4) in the foregoing embodiment. The first correspondence may further include a correspondence between the first QoS flow and content of the data carried in the first QoS flow, and the second correspondence may further include a correspondence between the first QoS flow and content of the data carried in the second QoS flow.

In this embodiment of this application, with reference to related descriptions in (5) in the first correspondence in the foregoing embodiment, in this scenario, the access network device can determine the first group of terminals corresponding to the data carried in the first QoS flow, can determine the second group of terminals corresponding to the data carried in the second QoS flow, and can further determine that the data carried in the first QoS flow and the second QoS flow is the same.

Based on this, because the data carried in the first QoS flow and the second QoS flow is the same, the access network device may send, to the set of the first group of terminals and the second group of terminals in a multicast manner, the data that is of the first service and that is carried in the first QoS flow or the second QoS flow.

In this embodiment of this application, the access network device may not sense service information, that is, does not sense a service to which the received data carried in the first QoS flow or the second QoS flow belongs. However, the access network device in this embodiment of this application may sense data, that is, the access network device may sense that the data carried in the first QoS flow and the second QoS flow is the same and belongs to a same service, that is, the first service in this embodiment of this application. It should be understood that the data of the first service in this embodiment of this application represents any data for the access network device.

In a possible implementation in which the session management function network element sends the first correspondence and the second correspondence to the access network device, in a scenario in which the first correspondence and the second correspondence each include a correspondence between index information of the data of the first service and identification information and/or tunnel information of a QoS flow of any terminal in the group of terminals, in this embodiment of this application, the session management function network element may send the first correspondence and the second correspondence to the access network device by using one piece of information to carry the first correspondence and the second correspondence, for example, may use session management information to carry both the first correspondence and the second correspondence.

In this embodiment of this application, when the access network device receives the data that is of the first service and that is carried in the first QoS flow from the first user plane function network element and the data that is of the first service and that is carried in the second QoS flow from the second user plane function network element, the access network device may determine, based on the first correspondence and the second correspondence, the group of terminals corresponding to the data of the first service, where the group of terminals may be the first group of terminals corresponding to the first QoS flow, the second group of terminals corresponding to the second QoS flow, or the set of the first group of terminals and the second group of terminals. Further, in this embodiment of this application, the access network device may send, to the group of terminals, the data that is of the first service and that is carried in the first QoS flow or the second QoS flow, and perform optimized transmission on the data, to improve use efficiency of resources on an air interface side.

The foregoing embodiment describes that the data that is of the first service and that is received by the access network device from a user plane function network element is carried in a QoS flow, for example, the first QoS flow or the second QoS flow. The following embodiment describes, with reference to FIG. 10A, another data transmission method provided in an embodiment of this application, that is, a manner in which the user plane function network element transmits the received data that is of the first service and that is carried in the at least one data flow. It should be understood that, in FIG. 10A, descriptions are provided by using an example in which the user plane function network element is a first user plane function network element.

Figure 10A:
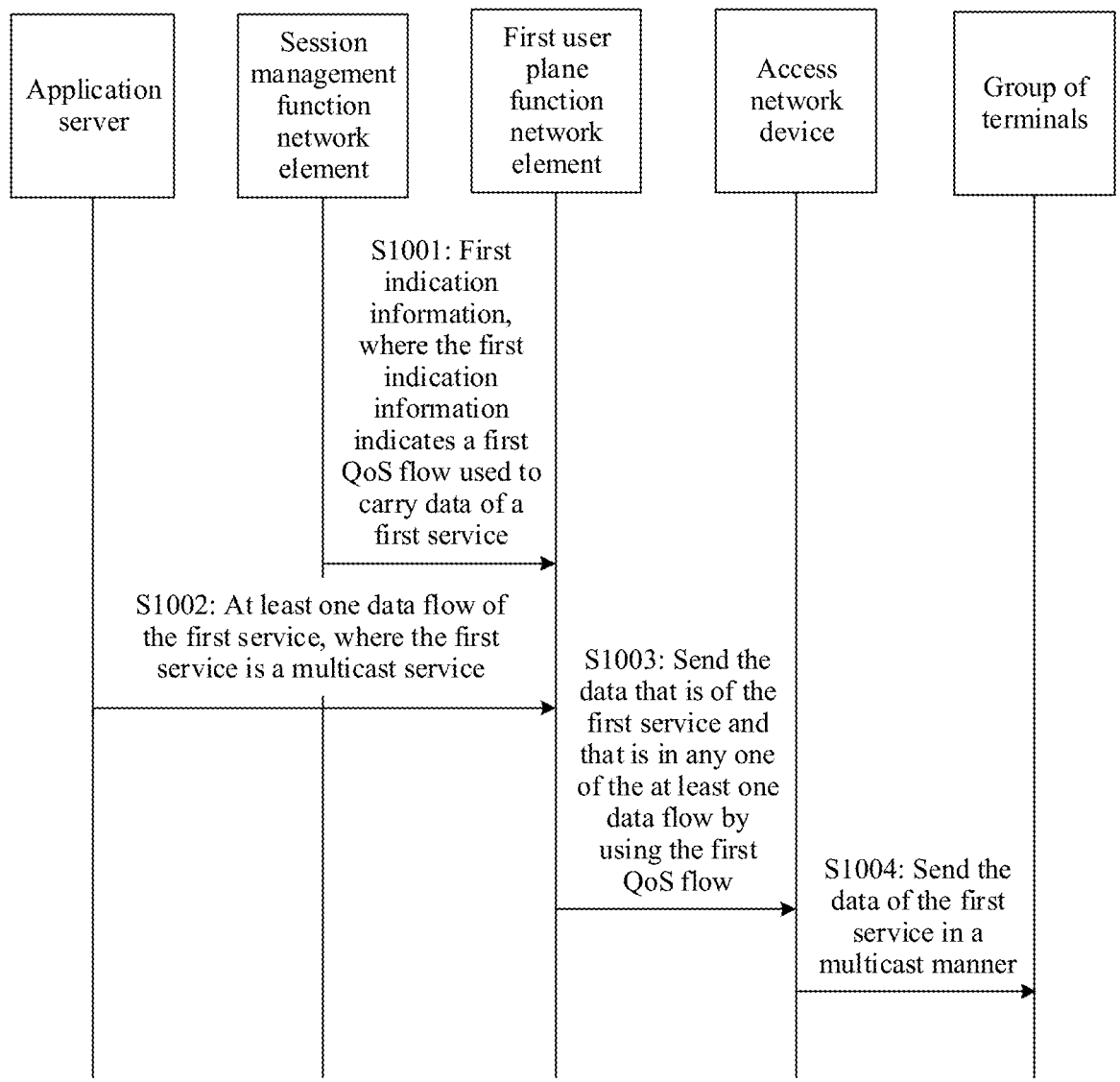
FIG. 10A and FIG. 10B each are a flowchart of another embodiment of a data transmission method according to an embodiment of this disclosure.

FIG. 10A is a schematic flowchart of another embodiment of a data transmission method according to an embodiment of this application. As shown in FIG. 10A, the data transmission method includes the following steps.

S1001: A session management function network element sends first indication information to a first user plane function network element, where the first indication information indicates a first QoS flow used to carry data of a first service.

S1002: An application server sends at least one data flow of the first service to the first user plane function network element, where the first service is a multicast service.

S1003: The first user plane function network element sends the data that is of the first service and that is in any one of the at least one data flow to an access network device by using the first QoS flow.

S1004: The access network device sends the data of the first service to a group of terminals in a multicast manner.

It should be understood that for implementations of S1002 to S1004 in this embodiment of this application, refer to related descriptions of S802 to S804 in the foregoing embodiment.

Corresponding to S1001, the first user plane function network element receives the first indication information from the session management function network element. The first indication information indicates the first QoS flow used to carry the data of the first service, and the first QoS flow includes a common QoS flow between the access network device and the first user plane function network element or a QoS flow of a first terminal.

The first indication information in this embodiment of this application may include a filtering rule of a group of terminals or a first correspondence. The group of terminals may include one or more terminals. The group of terminals is a group of terminals served by the first user plane function network element, and is the first group of terminals corresponding to the foregoing embodiment. For the first correspondence, refer to related descriptions in the foregoing embodiments. It should be noted that the first indication information in this embodiment of this application may further include the filtering rule of the group of terminals. The filtering rule of the group of terminals is used to indicate to map a received data flow of the group of terminals to the first QoS flow. Optionally, the filtering rule may include a relationship between the first QoS flow and 5-tuple information of the data that is of the first service and that corresponds to the group of terminals, 5-tuple information of the data of the first service corresponding to the group of terminals, or a relationship between the first QoS flow and a destination multicast address of the first service. The destination multicast address corresponds to the group of terminals.

In a possible implementation in which the first user plane function network element receives the first indication information, the session management function network element may generate the first indication information. For a manner of generating the first indication information and sending the first indication information by the session management function network element, refer to a manner of generating the first correspondence and related descriptions about sending the first correspondence by the session management function network element in the foregoing embodiment.

In a possible implementation in which the first user plane function network element receives the first indication information, the first indication information may be carried in a PDU session establishment/modification request (that is, an N4 session message between the SMF and the UPF shown in FIG. 1) for sending, or may be sent separately.

When the first indication information includes the filtering rule, the first indication information includes a filtering rule of one terminal (which may be a sending filtering rule of per UE), and the filtering rule indicates to map a data flow of the terminal to the first QoS flow. The first indication information may be carried in a PDU session establishment/modification request (that is, the N4 session message between the SMF and UPF) of the terminal. In this scenario, if the first QoS flow is a QoS flow of the terminal, optionally, if the QoS flow of the terminal changes, the corresponding session management function network element may adaptively adjust the filtering rule that is of the terminal and that is carried in the PDU session establishment/modification request sent to the terminal.

In this embodiment of this application, the first user plane function network element may determine, based on the first indication information, the first QoS flow that carries the data of the first service.

The first user plane function network element may determine, based on the first indication information, the group of terminals corresponding to the data of the first service. The first indication information may include a first correspondence. Specifically, for a manner in which the first user plane function network element determines, based on the first correspondence, the group of terminals corresponding to the data of the first service, refer to a manner in which the access network device determines, based on the first correspondence, the group of terminals corresponding to the data of the first service in the foregoing embodiment. In addition, in this embodiment of this application, the first user plane function network element may determine, according to the filtering rule, the group of terminals corresponding to the data of the first service. Specifically, the filtering rule is used to indicate a manner of obtaining, through filtering, the group of terminals corresponding to the data of the first service. The first user plane function network element may obtain, through filtering according to the filtering rule, the group of terminals corresponding to the data of the first service.

In a possible implementation in which the first user plane function network element determines the first QoS flow, after determining the group of terminals corresponding to the data of the first service, the first user plane function network element may determine the first QoS flow that carries the data of the first service. The first user plane function network element may use a QoS flow of any terminal in the group of terminals as the first QoS flow that carries the data of the first service, or may use a common QoS flow between the access network device and the first user plane function network element as the first QoS flow that carries the data of the first service. It should be understood that when the first QoS flow is the QoS flow of the any terminal in the group of terminals, the QoS flow of the first terminal is used as the first QoS flow in this embodiment of this application.

That the first user plane function network element uses the QoS flow of the any terminal in the group of terminals or the common QoS flow between the access network device and the first user plane function network element as the first QoS flow may be specified by the first indication information. When the first QoS flow is the common QoS flow between the access network device and the first user plane function network element, the first indication information may carry identification information and/or tunnel information of the common QoS flow. When the first QoS flow is the QoS flow of the any terminal in the group of terminals, the first indication information may not carry indication information of the first QoS flow. After determining the group of terminals, the first user plane function network element may use the QoS flow of the any terminal in the group of terminals as the first QoS flow.

In this embodiment of this application, the user plane function network element may receive the first indication information from the session management function network element, and the user plane function network element may determine, based on the first correspondence, the group of terminals corresponding to the data of the first service, and may further use the QoS flow of the any terminal in the group of terminals or the common QoS flow to carry the data of the first service, to improve use efficiency of resources on a core network side.

Figure 10B:
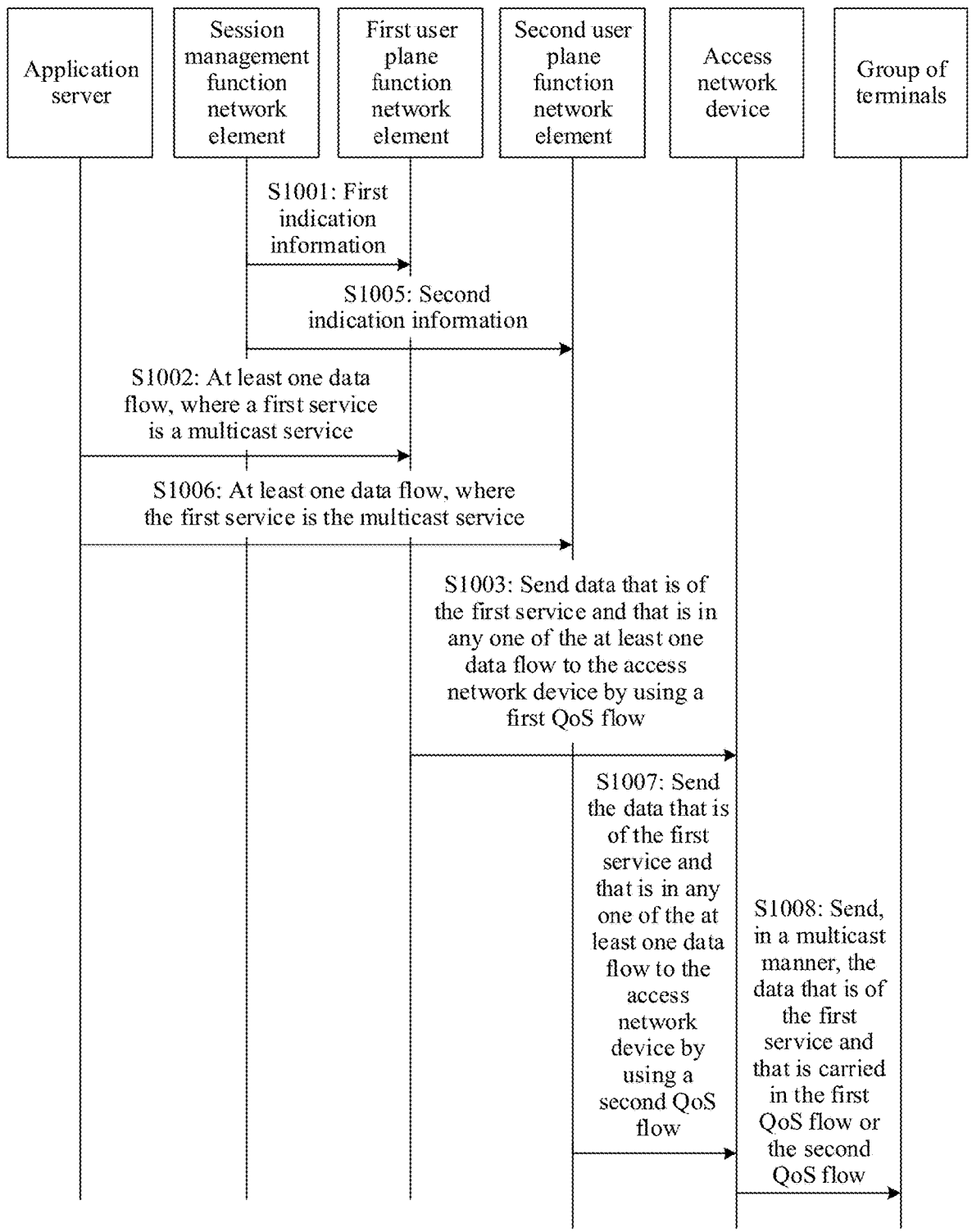

It should be understood that there may be a plurality of user plane function network elements in this embodiment of this application, and all the user plane function network elements perform a same action. For example, the user plane function network element that receives the first indication information may be used as the first user plane function network element, and the user plane function network element may further include a second user plane function network element. For details, refer to FIG. 10B. FIG. 10B is a schematic flowchart of another embodiment of a data transmission method according to an embodiment of this application. After S1001, the method may further include the following step:

S1005: The session management function network element sends second indication information to a second user plane function network element, where the second indication information indicates a second QoS flow used to carry the data of the first service.

Correspondingly, the method may further include the following step:

S1006: The application server sends the at least one data flow of the first service to the second user plane function network element, where the first service is the multicast service.

Correspondingly, the method may further include the following step:

S1007: The second user plane function network element sends the data that is of the first service and that is in any one of the at least one data flow to the access network device by using the second QoS flow.

For implementations of S1005, S1006, and S1007 in this embodiment of this application, refer to related descriptions of S1102, S1106, and S1108 in the following embodiment. Details are not described herein.

It should be understood that in this embodiment of this application, a sequence of S1001 and S1005 is not limited. S1001 and S1005 may be performed simultaneously. Correspondingly, a sequence of S1002 and S1006 and a sequence of S1003 and S1007 are not limited. S1002 and S1006 may be performed simultaneously, and S1003 and S1007 may be performed simultaneously.

After the access network device receives the data that is of the first service and that is carried in the first QoS flow and the second QoS flow, correspondingly, S1004 may be replaced with S1008: The access network device sends, to the group of terminals in a multicast manner, the data that is of the first service and that is carried in the first QoS flow or the second QoS flow.

Figure 11:
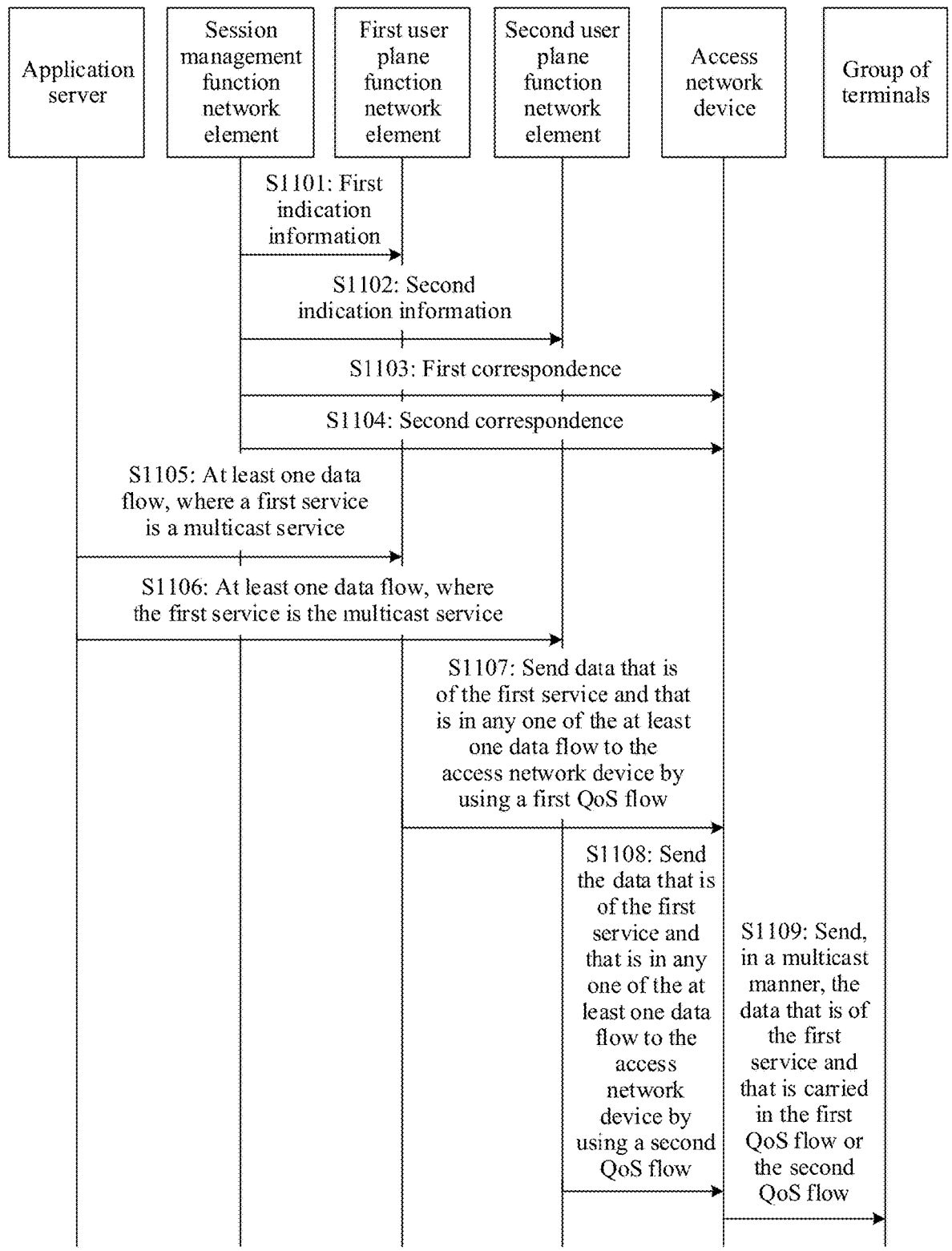
FIG. 11 is a flowchart of another embodiment of a data transmission method according to an embodiment of this disclosure.

In the scenario in which the access network device receives the data of the first service from the two user plane function network elements in the foregoing embodiment, the following describes, with reference to FIG. 11, a data transmission method provided in an embodiment of this application. FIG. 11 is a schematic flowchart of another embodiment of a data transmission method according to an embodiment of this application. As shown in FIG. 11, the data transmission method may include the following steps:

S1101: A session management function network element sends first indication information to a first user plane function network element.

S1102: The session management function network element sends second indication information to a second user plane function network element.

S1103: The session management function network element sends a first correspondence to an access network device.

S1104: The session management function network element sends a second correspondence to the access network device.

S1105: An application server sends at least one data flow of a first service to the first user plane function network element, where the first service is a multicast service.

S1106: The application server sends the at least one data flow of the first service to the second user plane function network element, where the first service is the multicast service.

S1107: The first user plane function network element sends data that is of the first service and that is in any one of the at least one data flow to the access network device by using a first QoS flow.

S1108: The second user plane function network element sends the data that is of the first service and that is in any one of the at least one data flow to the access network device by using a second QoS flow.

S1109: The access network device sends, to a group of terminals in a multicast manner, the data that is of the first service and that is carried in the first QoS flow or the second QoS flow.

It should be understood that in this embodiment of this application, a sequence of S1101 to S1104 is not limited. S1101 to S1104 may be performed simultaneously. Correspondingly, a sequence of S1105 and S1106 and a sequence of S1107 and S1108 are not limited. S1105 and S1106 may be performed simultaneously, and S1107 and S1108 may be performed simultaneously.

Different from FIG. 10A, in FIG. 11, the session management function network element and the access network device in this embodiment of this application correspond to two user plane function network elements. For implementations of S1102, S1104, S1105, S1106, and S1108, refer to related descriptions of S1001, S1002, S1003, S1004, and S1005 in the foregoing embodiment.

The foregoing embodiment describes a manner in which the user plane function network element sends the data that is of the first service and that is in any one of the at least one data flow to the access network device by using the first QoS flow, where the first QoS flow is one QoS flow. To be specific, the user plane function network element in the foregoing embodiment performs optimized transmission on the received data of the first service, to improve use efficiency of resources on a core network side. In addition, in the following embodiments, the data transmission method provided in this embodiment of this application is described from a perspective that the user plane function network element does not perform optimized transmission on the data of the first service.

Figure 12:
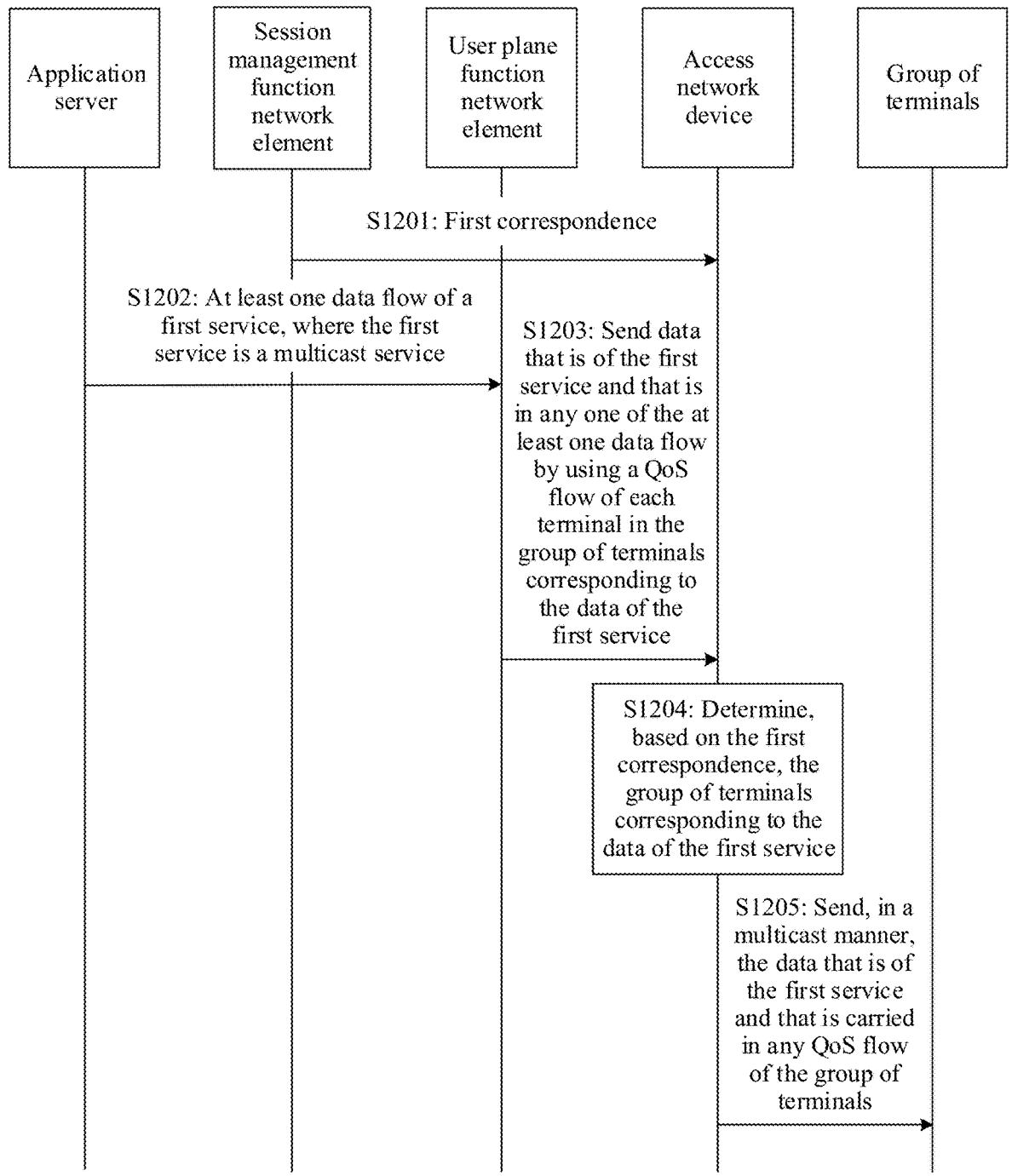
FIG. 12 is a flowchart of another embodiment of a data transmission method according to an embodiment of this disclosure.

FIG. 12 is a schematic flowchart of another embodiment of a data transmission method according to an embodiment of this application. As shown in FIG. 12, the data transmission method in this embodiment of this application may include the following steps:

S1201. A session management function network element sends a first correspondence to an access network device.

S1202: An application server sends at least one data flow of a first service to a user plane function network element, where the first service is a multicast service.

S1203: The user plane function network element sends data that is of the first service and that is in any one of the at least one data flow to the access network device by using a QoS flow of each terminal in a group of terminals corresponding to the data of the first service.

S1204: The access network device determines, based on the first correspondence, the group of terminals corresponding to the data of the first service.

S1205: The access network device sends, in a multicast manner, the data that is of the first service and that is carried in any QoS flow of the group of terminals to the group of terminals corresponding to the data of the first service.

For implementations of S1201, S1202, and S1204 in this embodiment of this application, refer to related descriptions of S1001, S1002, and S1006 in the foregoing embodiment.

In S1203, after receiving the at least one data flow of the first service from the application server, the user plane function network element may send the data that is of the first service and that is in any one of the at least one data flow to the access network device by using the established QoS flow of each terminal in the group of terminals. Different from the foregoing embodiment, in this embodiment of this application, the user plane function network element does not perform optimized transmission on the data of the first service (for example, sends the data that is of the first service and that is in any one of the at least one data flow to the access network device in the first QoS flow), but sends the data of the first service in the QoS flow of each terminal in the group of terminals.

Correspondingly, the access network device receives the data that is of the first service and that is carried in the QoS flow of each terminal in the group of terminals.

Figure 13:
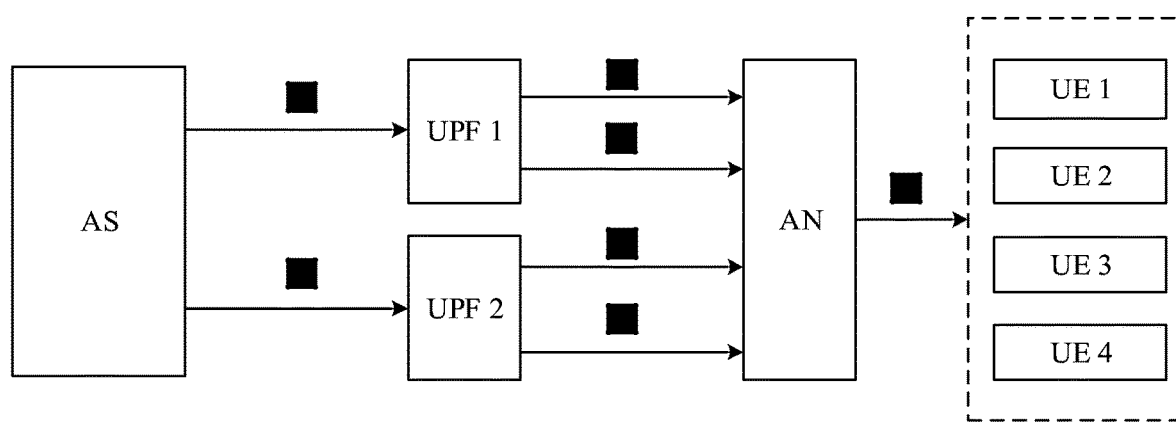
FIG. 13 is a schematic diagram 3 of a scenario of a data transmission method according to an embodiment of this disclosure.
Figure 14:
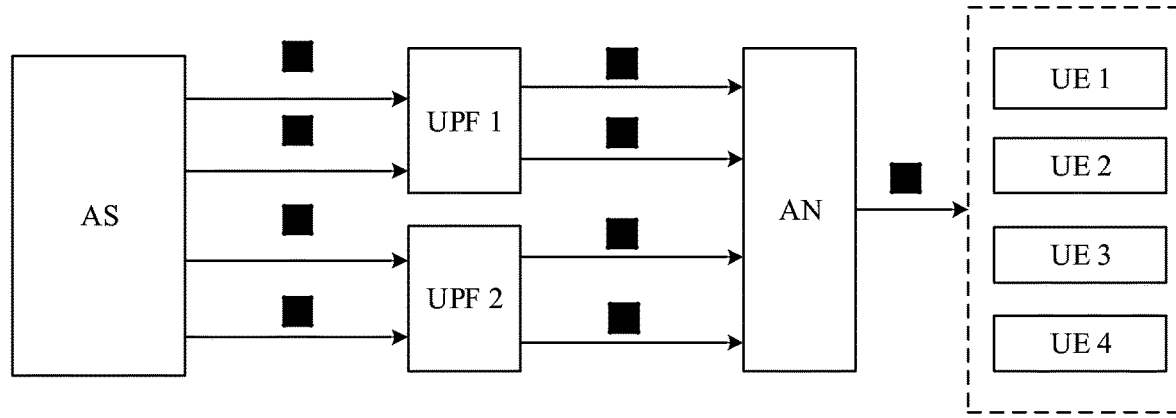
FIG. 14 is a schematic diagram 4 of a scenario of a data transmission method according to an embodiment of this disclosure.

For example, FIG. 13 is a schematic diagram 3 of a scenario of a data transmission method according to an embodiment of this application. As shown in FIG. 13, in this embodiment of this application, terminals that request data of a first service include UE 1, UE 2, UE 3, and UE 4. There are two user plane function network elements configured to forward the data of the first service: a UPF 1 and a UPF 2. A user plane function network element serving the UE 1 and the UE 2 is the UPF 1, and a user plane function network element serving the UE 3 and the UE 4 is the UPF 2. An AS sends one data flow of the first service to the UPF 1 and the UPF 2 respectively. FIG. 14 is a schematic diagram 4 of a scenario of a data transmission method according to an embodiment of this application. As shown in FIG. 14, the AS sends, to the UPF 1, a data flow corresponding to the data that is of the first service and that is requested by each UE, that is, the AS sends two data flows of the first service to the UPF 1. Correspondingly, the AS in FIG. 14 also sends two data flows of the first service to the UPF 2.

In this scenario, as shown in FIG. 13, the UPF 1 is used as an example. When receiving one data flow from the AS, the UPF 1 may send the data that is of the first service and that is in the data flow to the access network device by using a QoS flow of each terminal in a group of terminals, for example a QoS flow of the UE 1 and a QoS flow of the UE 2. The QoS flow of the UE 1 is a QoS flow that is of the UE 1 and that is used to transmit the data of the first service. Correspondingly, the QoS flow of the UE 2 is a QoS flow that is of the UE 2 and that is used to transmit the data of the first service. As shown in FIG. 14, when receiving two data flows from the AS, the UPF 1 may send the data that is of the first service and that is in any one of the two data flows to the access network device by using a QoS flow of each terminal in a group of terminals, for example, a QoS flow of the UE 1 and a QoS flow of the UE 2.

In this embodiment of this application, when the session management function network element sends the first correspondence to the access network device, the session management function network element may not send indication information to the user plane function network element, or the session management function network element may send indication information to the user plane function network element, but the user plane function network element does not perform optimized transmission on the received data of the first service. The indication information may include first indication information and second indication information.

In S1205, in this embodiment of this application, for a manner in which the access network device sends, in a multicast manner, the data of the first service to the group of terminals corresponding to the data of the first service, refer to S503. Different from S503, in S1205, the access network device may receive the data that is of the first service and that is carried in the QoS flow of each terminal in the group of terminals, and the access network device may select, from the QoS flows of each terminal in the group of terminals, the data that is of the first service and that is carried in the any QoS flow, and send the data of the first service to the group of terminals corresponding to the data of the first service.

Optionally, a first QoS flow selected by the access network device from the QoS flow of each terminal in the group of terminals may be an earliest established QoS flow of a terminal or a latest established QoS flow of a terminal.

In this embodiment of this application, in a possible implementation in which the access network device sends the data of the first service, the access network device may select, in a preset time window, the data of the first service from a same QoS flow (for example, a QoS flow of a first terminal) for sending. When no data is received in the QoS flow, the access network device may select the data that is of the first service and that is in another QoS flow for sending.

In this embodiment of this application, although the user plane function network element sends the data of the first service by using the QoS flow of each terminal in the group of terminals, a difference between this embodiment and the conventional technology lies in that in this embodiment of this application, the access network device may select, from the QoS flow of each terminal, the data that is of the first service and that is carried in the any QoS flow, and send the data of the first service to the group of terminals corresponding to the data of the first service, but does not send, to the group of terminals, all the received data that is of the first service and that is carried in the QoS flow of each terminal. Therefore, transmission of the data of the multicast service is optimized, a multicast channel does not need to be re-established, and a data transmission delay is reduced.

Figure 15:
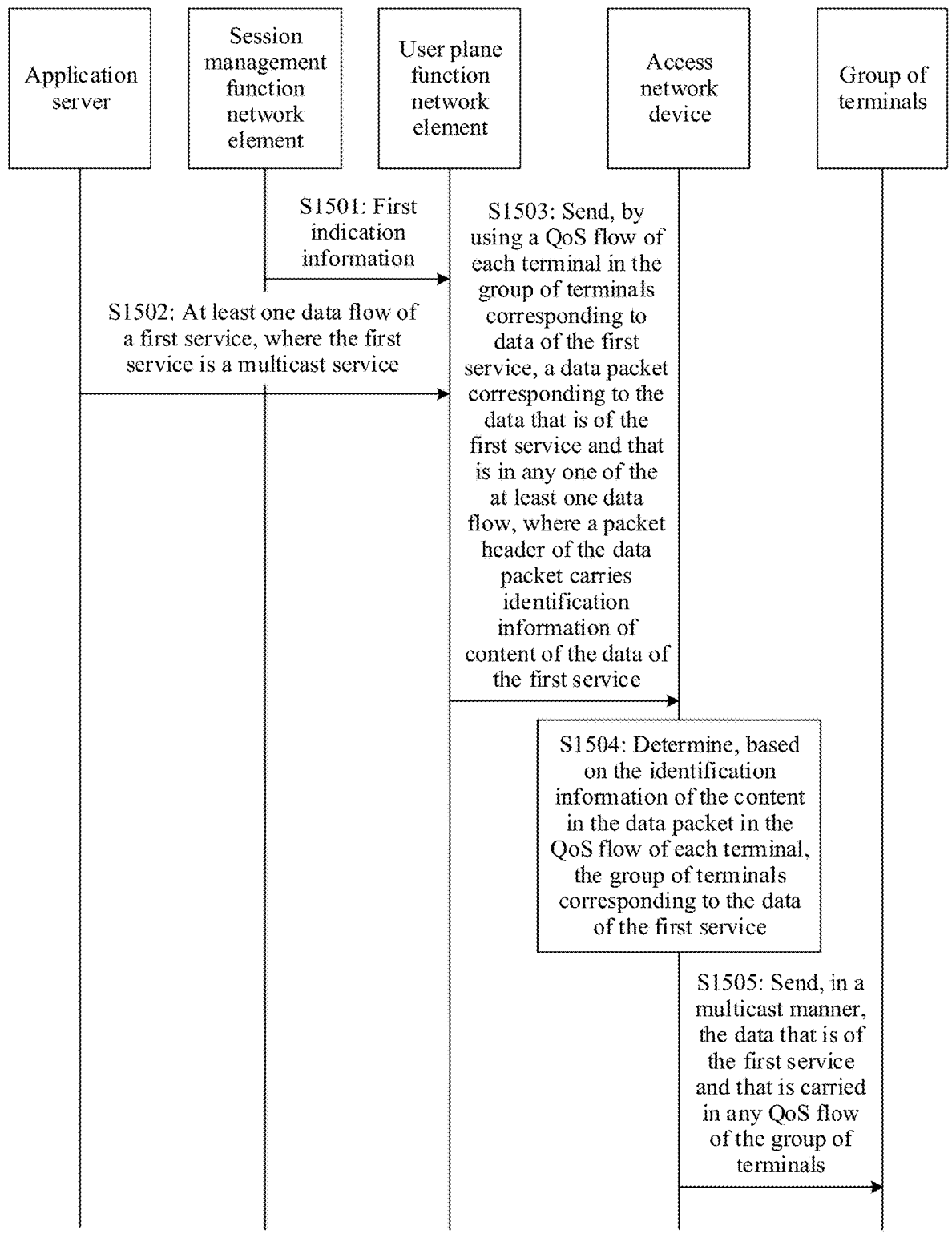
FIG. 15 is a flowchart of another embodiment of a data transmission method according to an embodiment of this disclosure.

FIG. 15 is a schematic flowchart of another embodiment of a data transmission method according to an embodiment of this application. As shown in FIG. 15, the data transmission method in this embodiment of this application may include the following steps:

S1501: A session management function network element sends first indication information to a user plane function network element.

S1502: An application server sends at least one data flow of a first service to the user plane function network element, where the first service is a multicast service.

S1503: The user plane function network element sends, to an access network device by using a QoS flow of each terminal in a group of terminals corresponding to data of the first service, a data packet corresponding to the data that is of the first service and that is in any one of the at least one data flow, where a packet header of the data packet carries identification information of content of the data of the first service.

S1504: The access network device determines, based on the identification information of the content in the data packet in the QoS flow of each terminal, the group of terminals corresponding to the data of the first service.

S1505: The access network device sends, in a multicast manner, the data that is of the first service and that is carried in any QoS flow of the group of terminals to the group of terminals corresponding to the data of the first service.

For implementations of S1501, S1502, and S1505 in this embodiment of this application, refer to related descriptions of S1001, S1002, and S1205 in the foregoing embodiments.

In S1503, the user plane function network element sends, to the access network device by using the QoS flow of each terminal in the group of terminals, the data that is of the first service and that is in any one of the at least one data flow, where the data is carried in a corresponding data packet.

In this embodiment of this application, the user plane function network element may receive the first indication information from the session management function network element, and can further determine, based on the first indication information, the group of terminals corresponding to the data of the first service. After receiving the at least one data flow that is of the first service and that corresponds to the group of terminals, the user plane function network element may mark the identification information in the data packet corresponding to the data that is of the first service and that is carried in the data flow, where the identification information is used to indicate the content of the data of the first service.

Correspondingly, in S1504, when receiving data packets carried in QoS flows, the access network device may determine, based on identification information in the data packets, whether data carried in the QoS flows is the same. Similarly, in this embodiment of this application, terminals corresponding to QoS flows that carry same data and that are received by the access network device in a preset time window are used as the group of terminals.

The access network device determines, based on the identification information of the content in the data packet in the QoS flow of each terminal, the group of terminals corresponding to the data of the first service.

In a possible implementation in which the access network device sends the data of the first service, the access network device may select, in a preset time window, the data of the first service from a same QoS flow (for example, a QoS flow of a first terminal) for sending. When no data is received in the QoS flow, the access network device may select the data that is of the first service and that is in another QoS flow for sending.

In this embodiment of this application, the user plane function network element may receive the first indication information from the session management function network element, and may determine, based on the first indication information, the group of terminals corresponding to the data of the first service. The user plane function network element marks the identification information indicating the data of the first service in the data packet corresponding to the data that is of the first service and that is carried in each QoS flow of the group of terminals. After receiving the data packet, the access network device may determine, based on the identification information in the data packet, QoS flows that are of terminals and that carry same data, and further determine the group of terminals. In this embodiment of this application, the access network device may select, from the QoS flow of each terminal, the data that is of the first service and that is carried in the any QoS flow, and send the data of the first service to the group of terminals corresponding to the data of the first service, but does not send, to the group of terminals, all the received data that is of the first service and that is carried in each QoS flow. Therefore, transmission of the data of the multicast service is optimized, a multicast channel does not need to be re-established, and a data transmission delay is reduced.

Figure 16:
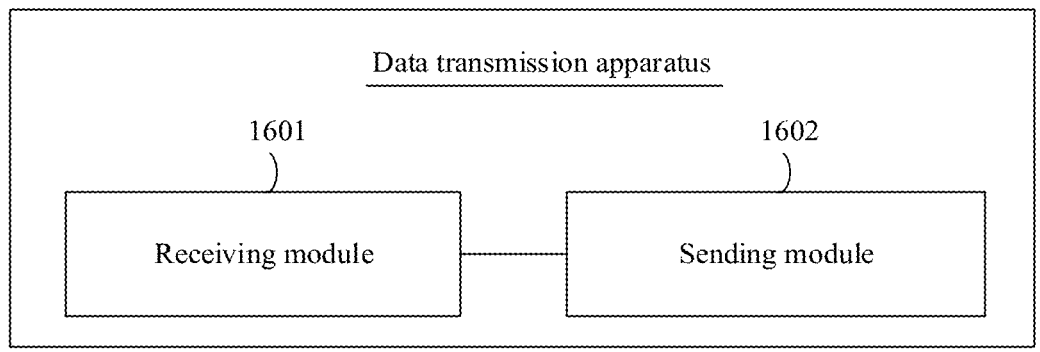
FIG. 16 is a schematic diagram of a structure of a data transmission apparatus according to an embodiment of this disclosure.

FIG. 16 is a schematic diagram of a structure of a data transmission apparatus according to an embodiment of this application. As shown in FIG. 16, the data transmission apparatus in this embodiment may be the access network device described above, or may be a chip applied to the access network device. The data transmission apparatus may be configured to perform actions of the access network device in the foregoing method embodiments. As shown in FIG. 16, the data transmission apparatus may include a receiving module 1601 and a sending module 1602.

The receiving module 1601 is configured to receive data that is of a first service and that is carried in a first QoS flow, where the first QoS flow includes a common QoS flow between the access network device and a first user plane function network element or a QoS flow of a first terminal, and both the access network device and the first user plane function network element are nodes in the QoS flow of the first terminal.

The sending module 1602 is configured to send, in a multicast manner, the data of the first service to a group of terminals corresponding to the data of the first service, where the group of terminals includes the first terminal.

In a possible design, the receiving module 1601 is further configured to receive the data that is of the first service and that is carried in a second QoS flow, where the second QoS flow includes a common QoS flow between the access network device and a second user plane function network element or a QoS flow of a second terminal, and both the access network device and the second user plane function network element are nodes in the QoS flow of the second terminal.

The group of terminals corresponding to the data of the first service includes: a first group of terminals corresponding to the first QoS flow; or a second group of terminals corresponding to the second QoS flow; or a set of the first group of terminals and the second group of terminals.

Correspondingly, the sending module 1602 is further configured to send, to the group of terminals in a multicast manner, the data that is of the first service and that is carried in the first QoS flow or the second QoS flow.

In a possible design, the receiving module 1601 is further configured to receive a first correspondence.

The first correspondence includes: a correspondence between the first QoS flow and the group of terminals; or a correspondence between the first QoS flow and any terminal in the group of terminals; or a correspondence between the first QoS flow and any terminal other than the first terminal in the group of terminals; or a correspondence between the data of the first service and any terminal in the group of terminals.

In a possible design, the first correspondence further includes a correspondence between the first QoS flow and content of the data carried in the first QoS flow.

In a possible design, the receiving module 1601 is specifically configured to receive the first correspondence from a session management function network element.

In a possible design, the correspondence between the first QoS flow and the group of terminals includes a correspondence between identification information of the first QoS flow and identification information and/or tunnel information of a QoS flow of each terminal in the group of terminals; the correspondence between the first QoS flow and the any terminal in the group of terminals includes a correspondence between the identification information of the first QoS flow and identification information and/or tunnel information of a QoS flow of the any terminal in the group of terminals; the correspondence between the first QoS flow and the any terminal other than the first terminal in the group of terminals includes a correspondence between the identification information of the first QoS flow and identification information and/or tunnel information of a QoS flow of the any terminal other than the first terminal in the group of terminals; and the correspondence between the data of the first service and the any terminal in the group of terminals includes a correspondence between index information of the data of the first service and identification information and/or tunnel information of a QoS flow of the any terminal in the group of terminals.

The data transmission apparatus provided in this embodiment of this application may perform the actions of the access network device in the foregoing method embodiments. An implementation principle and a technical effect of the data transmission apparatus are similar to those of the method embodiments. Details are not described herein again.

Figure 17:
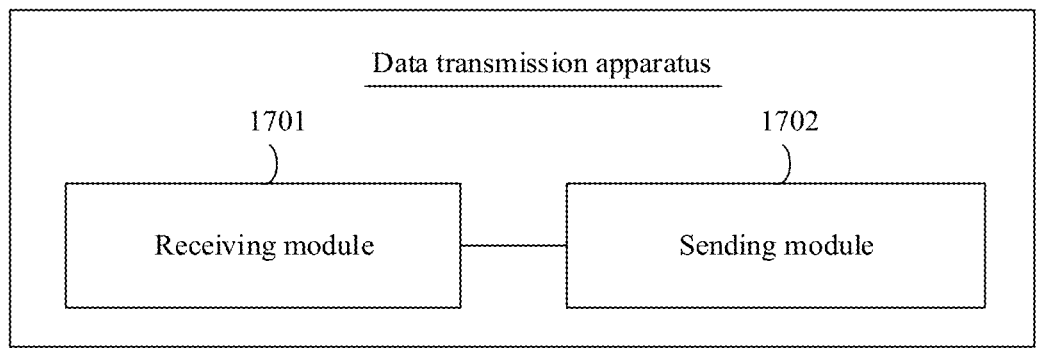
FIG. 17 is a schematic diagram of a structure of another data transmission apparatus according to an embodiment of this disclosure.

FIG. 17 is a schematic diagram of a structure of another data transmission apparatus according to an embodiment of this application. As shown in FIG. 17, the data transmission apparatus in this embodiment may be the user plane network element described above, or may be a chip applied to the user plane network element. The data transmission apparatus may be configured to perform actions of the user plane network element in the foregoing method embodiments. As shown in FIG. 17, the data transmission apparatus may include a receiving module 1701 and a sending module 1702.

The receiving module 1701 is configured to receive at least one data flow of a first service, where the first service is a multicast service.

The sending module 1702 is configured to send, to an access network device by using a first QoS flow, data that is of the first service and that is carried in any one of the at least one data flow, where the first QoS flow includes a common QoS flow between the access network device and the user plane function network element or a QoS flow of a first terminal, and both the access network device and the user plane function network element are nodes in the QoS flow of the first terminal.

In a possible design, the receiving module 1701 is further configured to receive first indication information from a session management function network element, where the first indication information indicates the first QoS flow used to carry the data of the first service.

In a possible design, the first indication information includes a filtering rule of a group of terminals or a first correspondence, where the group of terminals includes the first terminal.

The first correspondence includes: a correspondence between the first QoS flow and the group of terminals; or a correspondence between the first QoS flow and any terminal in the group of terminals; or a correspondence between the first QoS flow and any terminal other than the first terminal in the group of terminals; or a correspondence between the data of the first service and any terminal in the group of terminals.

In a possible design, the first correspondence further includes a correspondence between the first QoS flow and content of the data carried in the first QoS flow.

In a possible design, the correspondence between the first QoS flow and the group of terminals includes a correspondence between identification information of the first QoS flow and identification information and/or tunnel information of a QoS flow of each terminal in the group of terminals; the correspondence between the first QoS flow and the any terminal in the group of terminals includes a correspondence between the identification information of the first QoS flow and identification information and/or tunnel information of a QoS flow of the any terminal in the group of terminals; the correspondence between the first QoS flow and the any terminal other than the first terminal in the group of terminals includes a correspondence between the identification information of the first QoS flow and identification information and/or tunnel information of a QoS flow of the any terminal other than the first terminal in the group of terminals; and the correspondence between the data of the first service and the any terminal in the group of terminals includes a correspondence between index information of the data of the first service and identification information and/or tunnel information of a QoS flow of the any terminal in the group of terminals.

In a possible design, the receiving module 1701 is further configured to: receive a QoS flow establishment request from the session management function network element, and establish the first QoS flow, where the QoS flow establishment request indicates to establish the first QoS flow.

The data transmission apparatus provided in this embodiment of this application may perform the actions of the user plane network element in the foregoing method embodiments. An implementation principle and a technical effect of the data transmission apparatus are similar to those of the method embodiments. Details are not described herein again.

Figure 18:
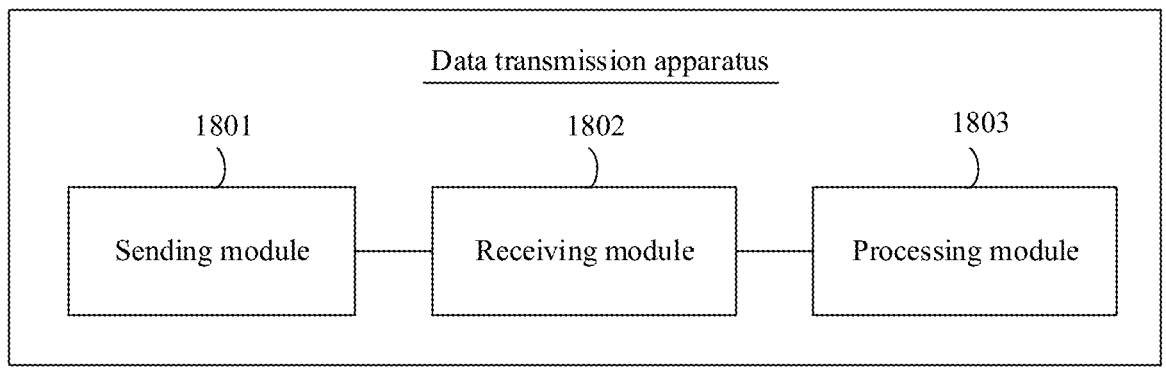
FIG. 18 is a schematic diagram of a structure of another data transmission apparatus according to an embodiment of this disclosure.

FIG. 18 is a schematic diagram of a structure of another data transmission apparatus according to an embodiment of this application. As shown in FIG. 18, the data transmission apparatus in this embodiment may be the session management function network element described above, or may be a chip applied to the session management function network element. The data transmission apparatus may be configured to perform actions of the session management function network element in the foregoing method embodiments. As shown in FIG. 18, the data transmission apparatus may include a sending module 1801, a receiving module 1802, and a processing module 1803.

The sending module 1801 is configured to send first indication information to a first user plane function network element, where the first indication information indicates a first QoS flow used to carry data of a first service; and the first QoS flow includes a common QoS flow between an access network device and the first user plane function network element or a QoS flow of a first terminal, both the access network device and the first user plane function network element are nodes in the QoS flow of the first terminal, and the first service is a multicast service.

In a possible design, the sending module 1801 is further configured to send second indication information to a second user plane function network element, where the second indication information indicates a second QoS flow used to carry the data of the first service, the second QoS flow includes a common QoS flow between the access network device and the second user plane function network element or a QoS flow of a second terminal, and both the access network device and the second user plane function network element are nodes in the QoS flow of the second terminal.

In a possible design, the first indication information includes a filtering rule of a group of terminals or a first correspondence, where the group of terminals includes the first terminal.

The first correspondence includes: a correspondence between the first QoS flow and the group of terminals; or a correspondence between the first QoS flow and any terminal in the group of terminals; or a correspondence between the first QoS flow and any terminal other than the first terminal in the group of terminals; or a correspondence between the data of the first service and any terminal in the group of terminals.

In a possible design, the first correspondence further includes a correspondence between the first QoS flow and content of the data carried in the first QoS flow.

In a possible design, the sending module 1801 is specifically configured to send a session management message to the access network device, where the session management message includes the first correspondence.

In a possible design, the correspondence between the first QoS flow and the group of terminals includes a correspondence between identification information of the first QoS flow and identification information and/or tunnel information of a QoS flow of each terminal in the group of terminals; the correspondence between the first QoS flow and the any terminal in the group of terminals includes a correspondence between the identification information of the first QoS flow and identification information and/or tunnel information of a QoS flow of the any terminal in the group of terminals; the correspondence between the first QoS flow and the any terminal other than the first terminal in the group of terminals includes a correspondence between the identification information of the first QoS flow and identification information and/or tunnel information of a QoS flow of the any terminal other than the first terminal in the group of terminals; and the correspondence between the data of the first service and the any terminal in the group of terminals includes a correspondence between index information of the data of the first service and identification information and/or tunnel information of a QoS flow of the any terminal in the group of terminals.

In a possible design, when the correspondence between the data of the first service and the any terminal in the group of terminals includes the correspondence between the index information of the data of the first service and the identification information and/or tunnel information of the QoS flow of the any terminal in the group of terminals, the processing module 1803 is configured to: obtain the index information from a server of the first service; or obtain the index information from the group of terminals; or generate the index information.

In a possible design, the receiving module 1802 receives a QoS flow establishment request from the first terminal or the server of the first service.

Correspondingly, the processing module 1803 is further configured to generate the first correspondence when the receiving module 1802 receives the QoS flow establishment request from the first terminal or the server of the first service, where the QoS flow establishment request indicates to establish the first QoS flow.

The data transmission apparatus provided in this embodiment of this application may perform the actions of the session management function network element in the foregoing method embodiments. An implementation principle and a technical effect of the data transmission apparatus are similar to those of the method embodiments. Details are not described herein again.

Figure 19:
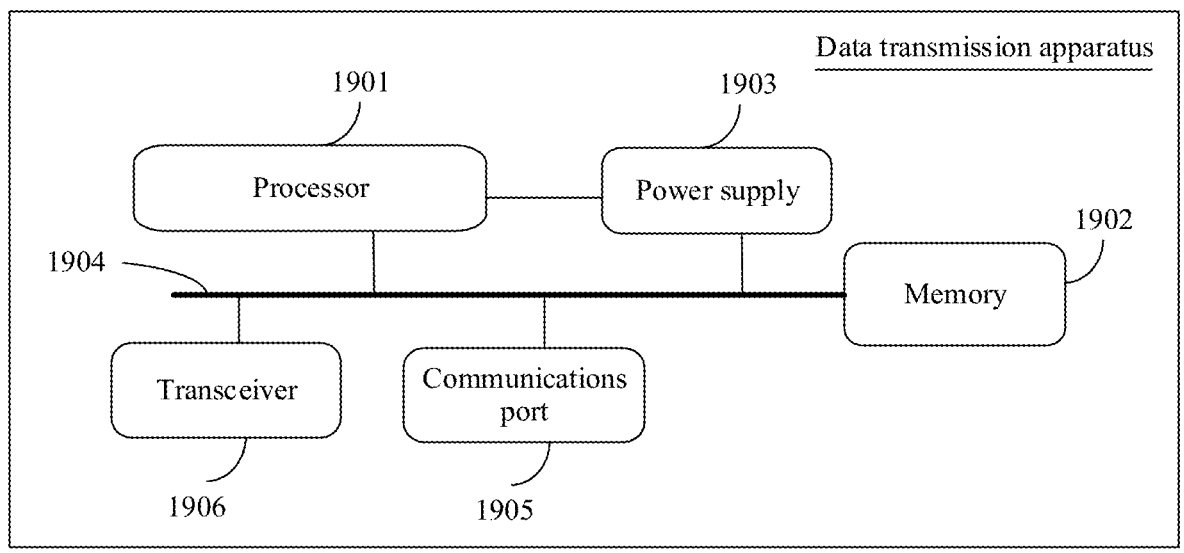
FIG. 19 is a schematic diagram of a structure of another data transmission apparatus according to an embodiment of this disclosure.

FIG. 19 is a schematic diagram of a structure of another data transmission apparatus according to an embodiment of this application. As shown in FIG. 19, the data transmission apparatus may be the access network device shown in FIG. 16, the user plane function network element shown in FIG. 17, or the session management function network element shown in FIG. 18. The data transmission apparatus may include a processor 1901 (for example, a CPU), a memory 1902, and a transceiver 1906. The memory 1902 may include a high-speed random access memory (RAM), and may further include a non-volatile memory (NVM), for example, at least one disk memory. The memory 1902 may store various instructions to complete various processing functions and implement the method steps of this application. Optionally, the data transmission apparatus in this application may further include a power supply 1903, a communications bus 1904, and a communications port 1905. The communications bus 1904 is configured to implement a communication connection between components. The communications port 1905 is configured to implement a communication connection between the data transmission apparatus and another peripheral. The transceiver 1906 is configured to point to the receiving or sending action of the access network device, the user plane function network element, or the session management function network element in the foregoing embodiments.

In this embodiment of this application, the memory 1902 is configured to store computer executable program code, where the program code includes instructions. When the processor 1901 executes the instructions, the instructions enable the processor 1901 of the data transmission apparatus to perform actions of the SMF network element in the foregoing method embodiments, or the instructions enable the processor 1901 of the data transmission apparatus to perform actions of the UPF network element in the foregoing method embodiments, or the instructions enable the processor 1901 of the data transmission apparatus to perform actions of the access network device in the foregoing method embodiments. An implementation principle and a technical effect of the data transmission apparatus are similar to those of the method embodiments. Details are not described herein again.

Figure 20:
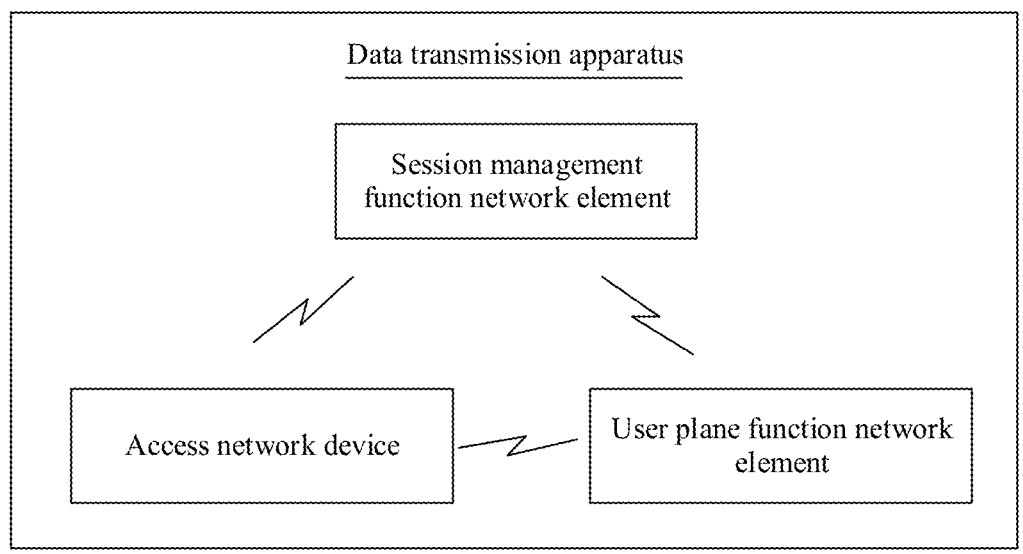
FIG. 20 is a schematic diagram of a structure of a data transmission system according to an embodiment of this disclosure.

An embodiment of this application further provides a data transmission system. FIG. 20 is a schematic diagram of a structure of a data transmission system according to an embodiment of this application. As shown in FIG. 20, the data transmission system may include an access network device, a user plane function network element, and a session management function network element.

The access network device may be the data transmission apparatus in FIG. 16, and is configured to perform actions of the access network device in the foregoing embodiments. The user plane function network element may be the data transmission apparatus in FIG. 17, and is configured to perform actions of the user plane function network element in the foregoing embodiments. The session management function network element may be the data transmission apparatus in FIG. 18, and is configured to perform actions of the session management function network element in the foregoing embodiments. Implementation principles and technical effects are similar. Details are not described herein again.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedures or functions according to the embodiments of this application are completely or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, DVD), a semiconductor medium (for example, a solid-state disk (SSD)), or the like.

The term "a plurality of" in this specification means two or more. The term "and/or" in this specification describes only an association relationship for describing associated objects and indicates that there may be three relationships. For example, A and/or B may represent the following three cases: Only A exists, both A and B exist, and only B exists. In addition, the character "I" in this specification usually indicates an "or" relationship between the associated objects. In a formula, the character "I" indicates a "division" relationship between associated objects.

It should be understood that various numbers in the embodiments of this application are merely used for ease of distinguishing, and are not used to limit the scope of the embodiments of this disclosure.

Moreover, it should be understood that reference to sequence numbers of the foregoing processes in the embodiments of this disclosure do not mean execution sequences. The execution sequences of the processes should be determined based on functions and internal logic of the processes and should not be construed as any limitation on the implementation processes of the embodiments of this disclosure.

What is claimed is:

1. A data transmission method, comprising:
receiving, by the access network device from a management function network element, a first correspondence between a first quality of service (QOS) flow and a first terminal, the first QoS flow comprising a common QoS flow between the access network device and a first user plane function network element;
receiving, by the access network device from the first user plane function network element, data of a first service carried in the first QoS flow; and
sending, by the access network device in a multicast manner, the data of the first service to a group of terminals corresponding to the data of the first service, the group of terminals including the first terminal and being determined based on the first correspondence received from the management function network element.

2. The method according to claim 1, further comprising:
receiving, by the access network device from a second user plane function network element, the data of the first service that is carried in a second QoS flow, the second QoS flow comprising a common QoS flow between the access network device and the second user plane function network element, wherein the group of terminals corresponding to the data of the first service comprises one of:
a first group of terminals corresponding to the first QoS flow;
a second group of terminals corresponding to the second QoS flow; or
a set of the first group of terminals and the second group of terminals.

3. The method according to claim 2, wherein the sending, by the access network device in the multicast manner, the data of the first service comprises:
selecting the data of the first service from the first user plane function network element or from the second user plane function network element; and
sending the selected data of the first service to the group of terminals in the multicast manner.

4. The method according to claim 1, wherein the first correspondence further comprises a correspondence between the first QoS flow and content of the data carried in the first QoS flow.

5. The method according to claim 1, wherein the management function network element is a session management function network element.

6. The method according to claim 1, wherein the first correspondence comprises a mapping between the first QoS flow and one or more QoS flows of the first terminal.

7. The method according to claim 1, wherein the first correspondence comprises a mapping between identification information of the first QoS flow and tunnel information of the first terminal.

8. The method according to claim 1, wherein the management function network element is an access and mobility management function network element.

9. A data transmission apparatus comprising a non-transitory memory and at least one processor, the non-transitory memory storing instructions that, when executed by the at least one processor, causes the data transmission apparatus to:
receive, from a management function network element, a first correspondence between a first quality of service (QOS) flow and a first terminal, the first QoS flow comprising a common QoS flow between the access network device and a first user plane function network element;
receive, from the first user plane function network element, data of a first service that is carried in the first QoS flow; and
send, in a multicast manner, the data of the first service to a group of terminals corresponding to the data of the first service, the group of terminals including the first terminal and being determined based on the first correspondence received from the management function network element.

10. The apparatus according to claim 9, wherein execution of the instructions by the at least one processor causes the transmission apparatus to:
receive, from a second user plane function network element, the data of the first service that is carried in a second QoS flow, the second QoS flow comprising a common QoS flow between the access network device and the second user plane function network element, wherein the group of terminals corresponding to the data of the first service comprises one of:
a first group of terminals corresponding to the first QoS flow; or
a second group of terminals corresponding to the second QoS flow; or
a set of the first group of terminals and the second group of terminals.

11. The apparatus according to claim 9, wherein the first correspondence comprises a correspondence between the first QoS flow and content of the data carried in the first QoS flow.

12. The data transmission apparatus according to claim 9, wherein the first correspondence comprises a mapping between the first QoS flow and one or more QoS flows of the first terminal.

13. The data transmission apparatus according to claim 9, wherein the first correspondence comprises a mapping between identification information of the first QoS flow and tunnel information of the first terminal.

14. The data transmission apparatus according to claim 9, wherein the management function network element is an access and mobility management function network element.

15. A non-transitory computer-readable storage medium having computer-executable code for data transmission by an access network device, the computer-executable code comprising computer instructions for:
receiving, from a management function network element, a first correspondence between a first quality of service (QOS) flow and a first terminal, the first QoS flow comprising a common QoS flow between the access network device and a first user plane function network element;
receiving, from the first user plane function network element, data of a first service that is carried in the first QoS flow; and
sending, in a multicast manner, the data of the first service to a group of terminals corresponding to the data of the first service, the group of terminals including the first terminal and being determined based on the first correspondence received from the management function network element.

16. The non-transitory computer-readable storage medium according to claim 15,
the computer-executable code further comprising computer instructions for:

receiving, from a second user plane function network element, the data of the first service that is carried in a second QoS flow, the second QoS flow comprising a common QoS flow between the access network device and the second user plane function network element, wherein the group of terminals corresponding to the data of the first service comprises one of:

a first group of terminals corresponding to the first QoS flow;

a second group of terminals corresponding to the second QoS flow; or a set of the first group of terminals and the second group of terminals.

17. The non-transitory computer-readable storage medium according to claim 16, wherein the sending in the multicast manner comprises:

selecting the data of the first service from the first user plane function network element or from the second user plane function network element; and sending the selected data of the first service to the group of terminals in the multicast manner.

18. The non-transitory computer-readable storage medium according to claim 15, wherein the management function network element is a session management function network element or an access and mobility management function network element.

19. The non-transitory computer-readable storage medium according to claim 15, wherein the first correspondence comprises a mapping between the first QoS flow and one or more QOS flows of the first terminal.

20. The non-transitory computer-readable storage medium according to claim 15, wherein the first correspondence comprises a mapping between identification information of the first QoS flow and tunnel information of the first terminal.

* * * * *